Jan. 18, 1955 J. H. McGUIGAN ET AL 2,700,148

MAGNETIC DRUM DIAL PULSE RECORDING AND STORAGE REGISTER

Filed Dec. 16, 1950 2 Sheets-Sheet 1

INVENTOR J. H. McGUIGAN
O. J. MURPHY
N. D. NEWBY

BY William F. Simpson.

ATTORNEY

Jan. 18, 1955 J. H. McGUIGAN ET AL 2,700,148

MAGNETIC DRUM DIAL PULSE RECORDING AND STORAGE REGISTER

Filed Dec. 16, 1950 2 Sheets-Sheet 2

INVENTORS J. H. McGUIGAN
O. J. MURPHY
N. D. NEWBY

BY William F. Simpson.

ATTORNEY

United States Patent Office 2,700,148

Patented Jan. 18, 1955

2,700,148

MAGNETIC DRUM DIAL PULSE RECORDING AND STORAGE REGISTER

John H. McGuigan, Summit, N. J., Orlando J. Murphy, New York, N. Y., and Neal D. Newby, Leonia, N. J., assignors to Bell Telephone Laboratories, Incorporated, New York, N. Y., a corporation of New York Application December 16, 1950, Serial No. 201,156

37 Claims. (Cl. 340—174)

This invention relates to call receivers and recording mechanisms, apparatus, circuits, and methods, and more particularly to call receivers and recorders common to a plurality of lines including apparatus for successively scanning or testing the electrical condition of each of the lines and recording the status of these lines in magnetic material which preferably takes the form of a continuously rotating magnetic drum or cylinder.

More particularly, this invention relates to improvements in call receivers and recorders of the types disclosed in an application of Brooks-Lovell-McGuigan-Murphy-Parkinson, Serial No. 183,636, filed September 7, 1950 and an application of N. D. Newby, Serial No. 185,929, filed September 21, 1950. The above two identified applications disclosed a plurality of calling lines such as telephone subscribers' lines or lines connecting call stations of annunciating systems or alarm systems. A scanning or testing mechanism is provided for scanning on a time-division basis and determining the electrical condition of each of the lines for brief intervals of time in succession and recording the various electrical conditions and sequences of electrical conditions encountered on each of the lines at the respective times in a continuously rotating magnetic drum. In both of those applications a delay section or drum is provided in combination with a main storage section or drum. The delay section is provided so that the signals stored representing any one line can be obtained at substantially the same time as the line is again sampled or tested and so that the previously stored signal or signals together with the presently determined electrical condition thereof may be employed to control further storage in the drum. Such an arrangement comprises, in effect, double storage for each and every element to be stored, and requires a large amount of apparatus and equipment including a large drum and a large plurality of recording and pick-up coils.

In accordance with the present invention, the size of the drum and the number of pick-up coils are reduced without elimination of functions by rearranging the control circuits so that a particular previously recorded signal may be recovered and a subsequent signal recorded under the joint control of the recovered signal and any other signal or condition in the same area of the drum during the same pass of this area under a single pick-up coil or core structure.

In a generic aspect this invention relates to suitable control circuits for first determining a character of a signal stored in an elemental area of magnetic material and then applying a signal to change the character of this signal under a particular combined recording and pick-up coil and thereafter preventing further change in the signal recorded, all during a single pass of a given area of the magnetic material of the drum.

Briefly, it has been discovered that when the magnetic condition of a small or elemental area under the pole-pieces or tips of a combined pick-up and recording coil located adjacent a continuously rotating magnetic cylinder is changed, there is some fringing of the magnetic flux beyond the dimensions or the areas of the pole-piece so that the magentized material within the drum extends beyond the boundaries of the associated pick-up coil. Thus the recorded spot or cell in the magnetic material comprises more area than that of the pick-up coil and in part, at least, includes the portion of the magnetic material which has already passed under the pole-pieces of the pick-up coil.

In addition, the nature of the magnetic recording in or on the magnetic material in response to a single pulse of a predetermined polarity causes a small area of magnetic material to be magnetized in a predetermined direction and, in effect, creates an area of flux in the surface of the magnetic material. When this area again passes under the pole-pieces, the rate of change of flux, and not the total quantity of flux, causes a voltage in the pick-up coil. Consequently, a voltage maximum is obtained in the pick-up coil a short interval of time before the center of the flux area or magnetic cell reaches the center of the pole-pieces.

It has been discovered that this short interval of time is sufficient to allow the characteristic of the previously recorded condition of a cell to be determined and then the magnetic condition of this area changed at approximately the time the center of the particular area passes under the respective pole-pieces of the recording coil. In this manner the number of pick-up coils and the size of the drums may be greatly reduced in comparison with the number of coils and other equipment required in the above-identified patent applications of Brooks et al. and Newby.

The foregoing objects and features of this invention may be more readily understood from the following description when read with reference to the attached drawing in which.

Figures 1, 2:
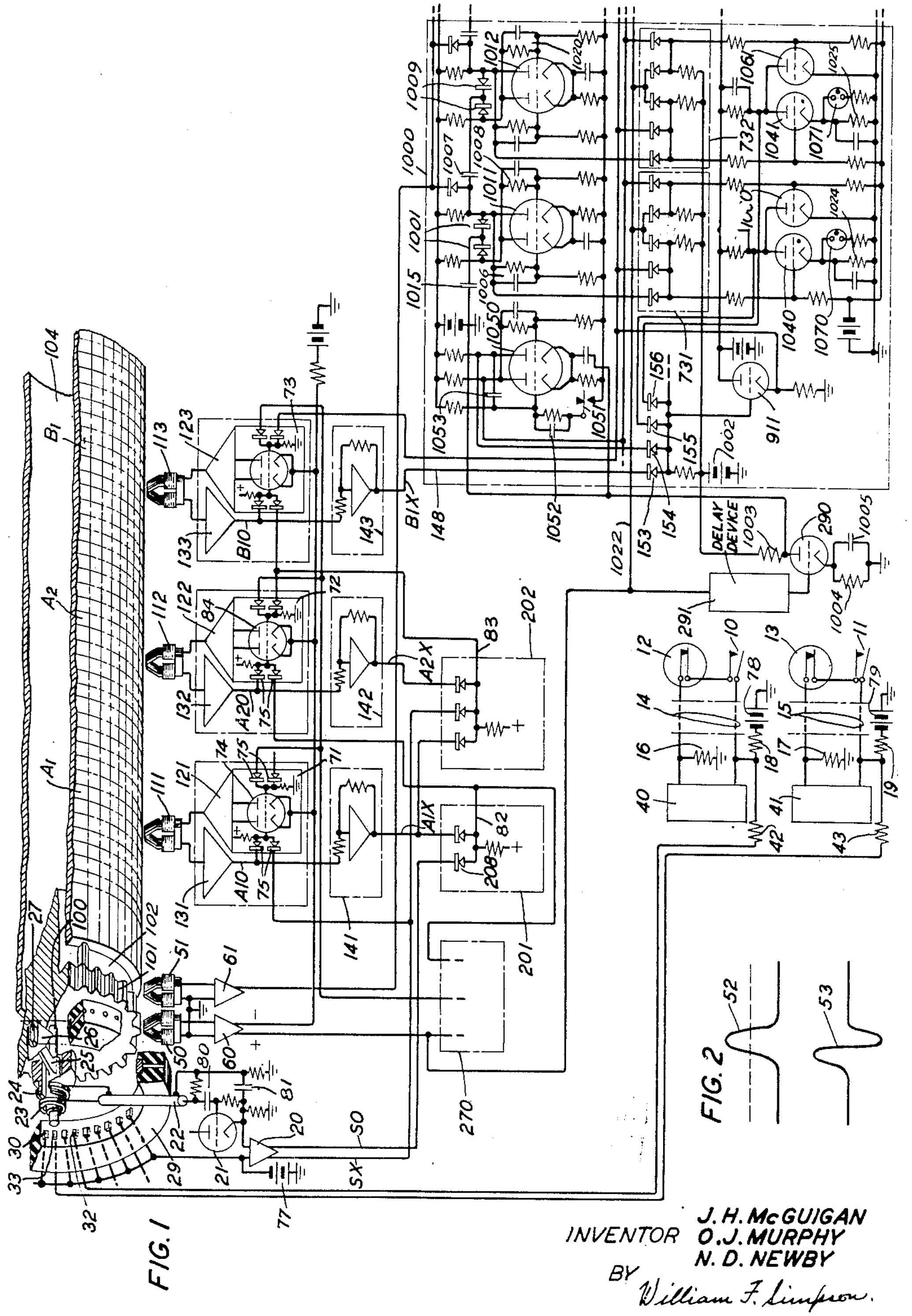
Fig. 1 shows the general arrangement of the scanning mechanism, the subscribers' lines and the pick-up coils and recording mechanisms, together with control circuits therefor.
Fig. 2 shows several curves indicating the mode of operation of applicants' improvement of the magnetic recording system.

Fig. 1, as is hereinafter described, shows the electrostatic scanner of a type suitable for use in combination with the magnetic drum 104 for recording calling signals such as encountered in telephone switching systems and other calling arrangements. As shown in the exemplary embodiment described herein in detail the scanner is mounted on the same shaft 100 as the rotating magnetic drum 104. However, when desired, this scanning mechanism may be driven from some other shaft which may be geared to the magnetic drum driving means or otherwise synchronized with the drum driving means.

The scanning device, as shown in the upper left-hand portion of Fig. 1, comprises a rotating conductive arm, electrode or element 25 insulatively mounted on shaft 100 which is the same shaft employed to rotate drum 104. The end 27 of the rotating arm 25 passes adjacent to but does not touch or make contact with a plurality of electrodes or segments 32, 33, etc. The arm 25 in approaching each segment 32, 33, etc. forms a condenser therewith and has a voltage or current induced on or in it in accordance with the voltage of the associated segments 32, 33, etc. The rotating arm 25 is surrounded by a shield 26 which rotates with arm 25 but is insulatively supported therefrom. The rotating arm or element 25 is likewise insulatively supported from the shaft 100. A pair of stationary rings or capacitive elements 23 and 24 are provided which are associated with the arm 25 and shield 26. The ring 23 is electrostatically coupled to the rotating arm 25 of the scanning or distributing mechanism and stationary ring 24 is electrostatically or capacitively coupled to the shield 26. As shown in the drawings the capacitive elements 23 and 24 are in the form of rings placed in close proximity to the respective rotating element 25 and shield 26 of the distributor or scanning mechanism with which they cooperate to form an electric circuit. It is to be understood of course that any suitable form of electrostatic capacitive coupling may be employed or that any other suitable type of coupling may be employed including brushes resting on slip rings. However, the capacitive coupling is employed in the present embodiment of this invention because it is particularly well adapted for coupling to the rotating elements comprising element 25 and shield 26 which in turn are capacitively coupled to the segments 32, 33, etc. This form of coupling introduces substantially no extraneous signals, noise currents or other interfering or stray currents, which would interfere with the low-level signals picked up by the rotating member 25 as will be described hereinafter. In order to prevent excessive voltage drop across this coupling capacity it is desirable that its capacity be large compared to the capacity between the rotating arm 25 and the segments 32, 33, etc. which it passes.

The segments 32, 33, etc., of the distributor are separated by shielding segments 30 which are connected to ground or battery as shown in the drawing. The segments 30 are provided to prevent interference between the various adjacent segments 32, 33, etc. assigned to the individual lines as will be described hereinafter and also to improve the response or output obtained from the rotating arm 25.

The shielded member 26 is provided together with the shielded cable 22 from the stationary rings 23 and 24 to prevent stray voltages induced from other sources from interfering with signals picked up by the rotating arm 25.

In an exemplary embodiment of the invention the recorder consists of a magnetic drum 104, the magnetic surface of which is provided with sufficient area to be employed in common by 1000 subscribers' lines, each line having reserved for its use an arc of about 0.36 degree. The line electrodes or segments 32, 33, etc. of the capacitive scanner for such an exemplary embodiment may be arranged on a flat plate perpendicular to the shaft or they may be arranged on the inner surface of a ring as shown on the drawing, the center line of the electrodes also being spaced 0.36 degree. The scanning arm 25 is mounted on the shaft 100 of the drum 104 and its associated amplifiers 21 and 20 are employed to amplify the received signals sufficiently to actuate the magnetic recording equipment.

As the scanning electrode 25 passes each line electrode such as 32, 33, etc., the electrical condition of the line may be recorded, as is hereinafter described, in the space on the magnetic drum 104 reserved for it.

The sampling rate, that is, the speed of rotation of the scanning arm 25 must be sufficiently high to recognize the significant characteristics of the pulses or other received signals which are to be recorded. Assuming that the signals are received in the form of dial pulses, then the speed of rotation of the magnetic drum 104 and also the scanning arm or electrode 25 must be at least one complete revolution for each open interval of the dial and another complete revolution for each closed interval of the dial. According to "Telephony," by Herbert and Proctor, 2nd ed., vol. I, page 401, published by Sir Isaac Pitman & Sons, Ltd., of London, 1932, and many other publications, commonly employed dial construction and operation are such as to give "break" pulses generally in the range of 66⅔ milliseconds and "make" pulses in the range of 33⅓ milliseconds duration, a dial of this specific kind would require a minimum drum speed of about 1800 revolutions per minute. In actual practice, to allow for the considerable variations in dial speed which are usually accepted and the effects of line distortion in lengthening and/or shortening pulses higher drum speeds may be used. In general, the speed of revolution of the drum is otherwise not critical. When desired, the scanning electrode 25 may make more than one revolution during each of these intervals and the system will operate the same as described hereinafter.

Inasmuch as the arm 25 rotates at a relatively high speed and inasmuch as the segments 32, 33, etc., are of relatively small dimensions measured in degrees of arc, the scanning circuit, hereinafter described, together with its amplifier and other related equipment must be designed to respond to pulses of relatively short duration and therefore to high frequency currents. If the calling or subscribers' lines 14, 15, etc. are subject to high frequency currents, it will be desirable and sometimes necessary to provide suitable filtering elements between the line circuits 14, 15, etc. and the electrostatic scanner. In the exemplary embodiment of the invention described in detail herein the capacity to ground of the distributor or scanner segments 32, 33, etc., together with resistors 42, 43, etc., form such a filter. When desired, other and additional filter elements may be employed. Of course, the filter elements required may vary depending upon the various spurious currents encountered on the calling lines 14, 15, etc.

As shown in the drawing the line segments 32, 33, etc. described above corresponding to the calling lines 14, 15, etc., are shown connected through series resistors 42, 43, etc. to resistors 18, 19, etc. through which the line currents flow. Consequently, the voltage drop across the resistors 18, 19, etc. are the voltages applied to the capacitive scanner segments 32, 33, etc. and these voltages cause the signals to be induced in the rotating element 25 as will be described hereinafter.

Another element of the present recording mechanism comprises a drum 104 of magnetic material. The drum 104 may be constructed of suitable structural material as, for example, brass, bronze tubing, stainless steel tubing, aluminum tubing, or any other suitable type of structural material including plastic materials and other insulating materials. The purpose of the structural material is to provide a cylindrical surface which may be rotated about its axis by driving means of suitable type such as an electric motor, not shown. The drum 104 may be driven directly by or by means of gears, belts or any other form of mechanical connection, and the motor or motors energized from a suitable source of power, including batteries or other means. The speed of the motor is not critical and need not be maintained in synchronism with any other apparatus, so long as it rotates the shaft 100 and thus the drum 104 and the capacitive collector or distributor or scanning element 25 at the same speed and in synchronism with each other and sufficiently fast to provide at least one sampling interval for each line during each of the shortest signaling conditions on the line which it is desired to recognize.

The surface of the drum 104 is accurately true running and is provided with a layer of magnetic material which in an exemplary embodiment employing a metallic drum may take the form of an electroplated coating of magnetic material, such as a nickel-cobalt alloy or the like which has a thickness in the range from approximately .0003 inch to approximately .0006 inch.

A plurality of recording and pick-up coil structures or heads 111, 112, 113, etc. are mounted in close proximity to the plated surface of drum 104 but not in contact therewith. It will be convenient hereafter to speak of the recording process as "writing." The signals to be "written" or "recorded" are of a pulse-like character and have one or the other of two different values or characteristics, one being called X signals and the other O signals. The recording and pick-up coil structures or heads 111, 112, 113, etc. comprise a core of ferromagnetic material having pole tips brought close together and placed in close proximity to the magnetic surface of the drum 104. Each of these coil structures 111, 112, 113, etc. is employed for both recording signals on the drum 104 and for picking up or reading signals from the drum 104. Coils are wound on each of these cores and when employed for recording or writing, a current is caused to flow through the coil to produce a magnetic flux between the pole tips which alters the magnetic condition of the surface of the drum 104 underneath the pole tips. When a coil is used to recover or respond to or read recorded signals the magnetic condition of the drum 104 induces a flux change between the pole-pieces and thus within the core structure. Consequently, a winding surrounding these cores has a voltage induced in it in accordance with the magnetic condition of the drum 104.

The circumferential area of the drum 104 which passes immediately beneath the pole tips of a given head 111, 112, 113, etc. is defined as a "channel" and that part of the channel which is directly under or immediately adjacent to the pole tips of a given head 111, 112, 113, etc. when a pulse of recording or writing current is applied to the corresponding coil is known as a spot, cell or elemental area. Each elemental area of the channel is assigned to a given line 14, 15, etc. In the case of a multiplicity of recording and pick-up heads or coils 111, 112, 113, etc., the aggregate of the elemental areas or cells which are under the several coils 111, 112, 113, etc.

at any one instant of time is defined as a "slot" and is assigned to a given line 14, 15, etc. It is to be understood that the use of the word "slot" does not connote any mechanical irregularity in the magnetic surface of the drum 104. The group of cells or elemental areas assigned to a calling line 14, 15, etc. pass under the respective coils 111, 112, 113, etc. at substantially the instant of time that the scanning electrode 25 is passing over the electrostatic segment 32, 33, etc. assigned to the same line 14, 15, etc. The simplest arrangement of such a slot is a rectangular area running parallel with the axis on the surface of the drum 104. It is to be understood, however, that in the usual case this slot will be more of a complicated form and is not therefore limited to such a rectangular area. When the various pick-up and recording coils or heads such as 111, 112, 113, etc., are staggered or arranged in the form of a helix around the drum 104 the slot may be helical or may have a saw-tooth form or other discontinuous shape depending upon the location of the various recording and pick-up heads 111, 112, 113, etc.

A recording amplifier 121, 122, 123, etc. is provided for each one of the combined recording and pick-up coils 111, 112, 113, etc. For example, amplifier 121 is provided for the recording coil 111, amplifier 122, for the recording coil 112, etc. As shown in Figs. 1 and 3A, and herein after described, control or gate circuits 71, 72, 73, etc. are associated with the recording amplifiers 121, 122, 123, etc. As shown by the recording amplifier 121 of Fig. 1, for example, the gate circuit 71 comprises a twin-control tube 74 and four diodes or rectifiers 75 such as germanium crystal rectifiers or high vacuum diodes. Both sections of the gate tube 74 are normally non-conducting so that no current flows in the output or anode circuits of either section. In order for sufficient current to flow in either section of tube 74, it is necessary that positive voltage be applied to the grid of the respective section and in addition, that a negative pulse be applied from the timing or synchronizing amplifier 60 to the associated cathode circuit. The two diodes 75 on the left of tube 74 are connected to the control element of the left-hand section of the gate tube 74 and are connected in such a manner that the input to both of the rectifiers 75 must be of a relatively high positive voltage in order that a sufficient positive voltage be repeated to the control element of the left-hand section of the gate tube 74. Thus, when a high positive voltage is applied to both of the left-hand inputs and a negative pulse from the timing circuit 60 supplied to the cathodes of the gate tube 74, current flows in the left-hand section of the gating tube 74 constituting an input for the recording amplifier 121 which in turn causes a writing or recording current to flow through windings of the combined pick-up and recording coil 111. This latter current produces a flux between the pole tips of the coil or head 111 which causes an X signal hereinafter described to be recorded in the elemental area of the magnetic drum 104 centered under the pole-pieces of the recording head 111. The two right-hand diodes 75 connected to the control element of the right-hand section of the gating tube 74 are connected in an opposite manner as the diodes 75 connected to the left-hand control element. If a relatively high positive voltage is applied to either of the input diodes 75 on the right, current flows in the right-hand section in the gating tube 74 upon the application of a negative timing pulse from amplifier 60 to the cathodes of the gating tube. As a result, the anode current flowing through the right-hand section of tube 74 causes the recording amplifier 121 to apply the recording current to the recording coil 111. The current applied to coil 111 by means of the right-hand gates or diodes 75 associated with amplifier 121 causes a flux between the pole tips of coil 111 which flux is in the opposite direction to the flux produced by the current from the left-hand diodes 75 of amplifier 121 and thus in such a direction than an O signal may be recorded in the magnetic material then under the pole-pieces of coil 111.

In addition to a recording amplifier 121, 122, 123, etc. for each of the combined recording and pick-up coils 111, 112, 113, etc., the pick-up or reading amplifiers 131, 132, 133, etc. are provided individual to each of the coils 111, 112, 113, etc. For example, amplifier 131 is individual to coil 111, amplifier 132 is individual to coil 112, etc.

The input to amplifier 131 for example, is connected to a pick-up winding on the pick-up and recording coil 111. The amplifier 131 is provided with an output lead designated A1O. The output of amplifier 131 comprises a relatively high positive voltage as long as O signals recorded in the magnetic elements or elemental areas of the drum 104 pass under the combined pick-up and recording coil 111. However, when an X signal recorded in the magnetic material of an elemental area of the drum 104 passes under the pole tips of the pick-up coil 111, the output on the A1O lead falls to a relatively low or less positive value.

The A1O lead in addition to being connected to one of the left-hand inputs of the amplifier 121, as shown in Fig. 1, also extends to the input circuit of a phase inverting amplifier 141. The amplifier 141 is arranged to have substantially unity gain and to invert the signals appearing on the A1O lead. The output lead A1X from amplifier 141 thus has a high positive voltage when the A1O has a low positive or negative voltage. Conversely, when a high positive voltage is applied to the A1O lead by amplier 131 in response to an O signal passing under the pole-piece of coil 111 a low positive or negative voltage is applied by amplifier 141 to the output lead A1X. Thus the A1O lead has a high positive voltage applied to it when O signals pass under the pole-pieces of coil 111 and the A1X lead has a high positive voltage applied to it when an X signal passes under the pole-pieces of coil 111.

In addition to the pick-up and recording coils 111, 112, 113, etc. located adjacent the magnetic drum 104 described above, additional pick-up coils such as 50 and 51 are provided for generating timing and synchronizing pulses. As shown in Fig. 1 the coils 50 and 51 are located adjacent the periphery of the timing wheels 101 and 192 which are shown to be in the form of gear wheels. Coil 50 is adjacent the wheel 101 having a plurality of substantially uniform spaced teeth or poles while coil 51 is adjacent the timing wheel 102 having a single gear tooth or pole. Each of the teeth or poles of the wheel 101 adjacent coil 50 generates a pulse which is employed to control the recording of signals in the drum 104 as will be described hereinafter. During each revolution a single pulse due to wheel 102 is generated in coil 51 which is used to restore numerous circuits, hereinafter described, to their initial condition so these circuits may start from a given initial condition once during each revolution. Consequently, errors in the circuits will not be additive for more than one revolution of the drum 104 and the circuits are self-synchronizing when the drum 104 starts from rest. While special coils 50 and 51 are shown adjacent the gear or toothed wheels 101 and 102 for generating timing purposes, it is also within the scope of this invention to provide the timing pulses from pick-up coils such as 50 and 51 located adjacent channels on the magnetic drum 104 which channels will have the synchronizing pulses recorded in them in any suitable manner such as by an oscillator or continuous pulse generator or the like. However, in the exemplary embodiment set forth herein the timing pulses are generated by means of the toothed wheels 101 and 102 which are mounted upon the same shaft 100 or at least driven at the same speed as the magnetic drum 104 and usually from the same motor or other driving means, not shown. The outputs of coils 50 and 51 are amplified by the respective amplifiers 60 and 61. Output coil 50 and amplifier 60 are so designed that a high positive and a high negative output pulse is obtained for each tooth of the gear wheel 101 which passes under the pole-pieces of coil 50. The amplifier 60 contains the necessary pulse forming, pulse shaping means and means for otherwise controlling pulse characteristics as required. In an exemplary embodiment of this invention, pulse output from amplifier 60 for each of the teeth of the gear wheel 101 under coil 50 has a duration of approximately one-tenth the time required for a cell of the magnetic surface of the drum 104 as defined above to pass under a pick-up coil 111, 112, 113, etc. This pulse duration is not critical and satisfactory results may be obtained with pulses of such a duration.

The output from amplifier 61 comprises a pulse of high negative voltage or polarity for each revolution of the drum 104 or the single tooth wheel 102. This pulse has a duration which is appreciably greater than the duration of the timing pulses obtained from amplifier 60 but still shorter than the time required for a cell or elemental area on drum 104 to pass under a recording or pick-up head 111, 112, 113, etc.

The signals to be recorded will comprise either one or the other of the two different signaling conditions such as voltage or potential conditions across the line resistor 18, 19, etc., depending upon whether the line 14, 15, etc. is opened or closed as is hereinafter described. One of these signaling conditions is called an X signal herein and the other of these signaling conditions is called an O signal. These two different signaling conditions, i. e., X signals and O signals are represented by different currents or voltages or different voltage conditions or different current conditions in different circuits, conductors and terminals in the system. These X signals may also be represented by different magnetic conditions in parts of the equipment. These signaling conditions most frequently comprise a voltage or current of one polarity, i. e., positive or negative, of relatively high, large, or maximum magnitude and a voltage or current of the same polarity but of relatively low or minimum magnitude. When desirable these signaling conditions may be represented by other voltages or currents such as by positive and negative currents or voltages of the same or different magnitudes, or by current and no current, i. e., a current of substantially zero magnitude, or by a voltage and no voltage, etc.

The operation of the system may be better understood and the initial operation of the system improved, if it is assumed that the drum 104 is initially magnetized by applying a substantially continuous recording current to each of the recording windings of the coils 111, 112, 113, etc. which substantially saturates the magnetic material in the drum 104 as it passes under the pole-pieces of each of the recording coils in one of the magnetic conditions caused by one of the two different types of signals or voltage conditions to be recorded in the drum 104. Thus it is assumed that this voltage will be in the same direction as produced by the so-called O signal when it is desired to record such a signal in the drum 104. Of course, the opposite or X signal will then comprise magnetizing the drum 104 in the reverse direction between the pole-pieces.

Curve 52 in Fig. 2 represents a typical flux pattern of an X signal recorded in a cell of the magnetic drum 104, it being assumed that X's are not recorded in the adjacent cells. In other words, the magnetization of these cells is in one direction as shown below the dotted line and magnetization or flux reverses in the small elemental area or cell as shown in curve 52 and then again returns to the original condition beyond the physical boundaries of the elemental area or cell of the magnetic drum 104. Such a flux pattern is created by the application of a suitable current to the recording winding of the core structure 111, 112, 113, etc. which causes a large flux to flow through the core structure 111, 112, 113, etc. and from the pole tips to the elemental area of the magnetic drum 104. Curve 53 of Fig. 2 shows a typical wave form of the voltage induced in a pick-up or reading winding on the core structure 111, 112, 113, etc. when an elemental area having the flux pattern as shown by curve 52 again passes under the pole tips of the core structure 111, 112, 113, etc. upon the next and succeeding revolutions, assuming, of course, that no further recording or writing current or pulses are applied to the coil structure 111, 112, 113, etc. It will be observed from curves 53 and 52 that the voltage reaches its maximum value appreciably ahead of the center of the flux pattern in the cell as shown by curve 52. As a result it is possible to determine the character of the signal stored in this cell before the cell reaches the center of the pole-pieces of the reading and recording coil 111, 112, 113, etc.

It has been discovered that it is possible to design the control circuits and related amplifiers so that they will respond sufficiently fast to first determine the character of the signal recorded in a given cell as this cell approaches the pole-pieces of a coil 111, 112, 113, etc. as shown in curves 52 and 53 and then when the cell has become approximately centered under the recording coil or structure 111, 112, 113, etc. apply a recording or writing pulse to the corresponding winding under the combined control of a signal previously recorded in the cell and any additional signals or control voltages as may be desired. These additional signals may come from the scanning device described above and hence from the line 14, 15, etc. or they may come from other signals recorded in other cells of the drum 104, or from any other source. In general, if an X signal has already been recorded in the cell, it is not necessary to record another X on top of the one already recorded there because no useful result is obtained. However, the circuits and systems work satisfactorily where such operation is encountered. When it is desired to record a signal of opposite character in the cell to that determined by the pick-up coil 111, 112, 113, etc. as the cell approaches the coil 111, 112, 113, etc., the application of the appropriate type of current to the recording section or winding of the coil 111, 112, 113, etc. will erase the recorded signals sufficiently so that the circuits will respond properly to the residual magnetism within the cell as if the cell were completely restored to its initial condition. In other words, a small residual magnetism may remain in the cell but is of insufficient magnitude to improperly effect the operation of the system particularly when suitable precautions of bias and gating procedures are followed as is well understood by persons skilled in the art.

In recording a signal of opposite character to the signal already recorded in a cell on drum 104, the magnitude of the recording current is far in excess of the magnitude of the signal applied to the receiving or reading amplifier 131, 132, 133, etc. in response to the previously recorded signal. Consequently, the writing signal far overbalances the signal obtained from the previously stored magnetic condition in the drum 104 with the result that the character of the output of the pick-up or reading equipment, which includes amplifiers 131, 132, 133, etc. and amplifiers 141, 142, 143, etc., changes the instant the recording pulse is applied to the coil 111, 112, 113, etc. Under certain control circumstances this change in output of the reading or pick-up equipment might tend to cause the opposite type of signal to be applied to the recording coils on heads 111, 112, 113, etc. with the result that the recording of the desired signals is interfered with and in some cases may be totally lost. In order to prevent such an improper operation, it is necessary to insure that only one signal will be recorded in any one pass of a cell under the pole tips of a pick-up and recording coil structure 111, 112, 113, etc. As will be described hereinafter, the recording amplifiers 121, 122, 123, etc. for supplying the recording current or pulses are arranged so that only one type of pulse may be recorded during the time any one cell is under the pole tips of the pick-up and recording coil structure 111, 112, 113, etc.

Assume that initially all of the channels and areas of the drum 104 have a magnetic condition, representing or corresponding to O signals recorded in them. It is furthermore assumed that all the calling lines 14, 15, etc. individual to the drum 104 are open. Under these circumstances the drum 104 and scanning arm 25 continue to rotate but the associated circuits described above do not respond in any way to cause any signals to be recorded in the drum 104. Two lines 14 and 15, shown in Fig. 1, represent a large plurality of lines individual to the drum 104. Only a section of drum 104 is shown in the drawing but it is to be understood that in the exemplary embodiment set forth herein in detail the drum 104 comprises a right cylinder of magnetic material which is continuously rotated at a substantially uniform speed by any suitable driving means, not shown, such as an electric motor. The timing wheels, gears, or rotors 101 and 102 are likewise driven by the same motor and as shown in Fig. 1 by the same shaft 100. Likewise, the electrostatic scanning mechanism arm or distributor 25 is similarly driven by the same shaft 100 in the embodiment of Fig. 1. The pick-up coils 50 and 51 together with output amplifiers 60 and 61, respectively continue to generate pulses employed for timing and control of the system as will be described hereinafter. The output of amplifier 60 comprises a series of positive pulses and a series of negative pulses, one of these pulses being generated for each tooth or pole-piece of the timing wheel 101. Thus one timing pulse is generated for each of the cells around the periphery of the drum 104 or more particularly for each of the slots of the drum 104. As described above the slots are individually assigned to different ones of the calling lines 14, 15, etc.

Each calling line 14, 15, etc. includes a switch similar to switches 10 and 11 and a signal generator such as a dial 12 or 13. In addition where desired, the line 14, 15, etc. may also include terminal equipment such as 40 and 41 which in the case of a telephone switching system may comprise telephone and voice transmission equipment. Of course, the terminal equipment 40 and 41 must not provide a direct-current path between the two line conductors of lines 14 or 15. In addition, battery or source 78 or 79 is supplied over the calling line 14 or 15 in a circuit including a resistor 18 or 19 one terminal of which is connected to battery 78 or 79 and the other terminal of which is connected to the line 14 or 15 and another resistor 16 or 17 connected between the other line conductor of line 14 or 15 and ground.

Normally, as long as the line circuit 14 remains open a no-voltage drop appears across the resistors 16 and 18. As a result, substantially the entire battery voltage of source 78 is applied to the line segment 32 through the resistor 42. However, when the line circuit of line 14 is closed by the actuation of the key or switching device 10, line current flows through resistors 16 and 18 and over the line conductors 14. As a result there is a voltage drop across resistors 16 and 18 so that a different voltage is applied to the line segment 32 of line 14. Thus two different voltage or potential conditions are applied to the segment 32, one in response to an idle or open condition of line 14 and the other in response to a closed condition of line 14. The scanning element or arm 25 rotating past the segment 32 likewise will have either one or the other of two different potentials or voltages induced upon it depending upon whether the line 14 is open or closed.

As shown in the drawing, shield members, such as 30 interposed between each of the line segments 32, 33, etc., are connected to the battery 77 which supplies the same potential as battery 78. Thus when the scanning element or arm 25 rotates past the segments 30, it will have induced upon it the same voltage as when it rotates past a segment 32, 33, etc. connected to an idle line, such as 14 or 15. It is to be understood of course that the shielding segment should be connected to ground or, as in the specific embodiment employed herein, to other suitable fixed potential by a low impedance path. The voltage of the segments 30 remains unchanged and is unaffected by the voltages applied to the respective line segments 32, 33, etc. The segments 30 in this manner effectively shield the line segments 32, 33, etc. and prevent "crosstalk" between the various line segments 32, 33, etc., that is, they prevent potential conditions of any one line segment 32, 33, etc. from affecting the voltage induced in the pick-up arm 25 when it is passing adjacent to other line segments 32, 33, etc.

A cathode follower tube 21 is connected to the scanning element 25 by means of a suitable shielded conductor 22 and is employed as an impedance changing device to drive the main amplifier 20 and also to apply a voltage to the shield member 26, described above, and the outer conductor or shield of the shielded line 22 connecting the amplifier 20 to the stationary ring 24. The applied voltage from tube 21 is similar to the voltage induced upon arm 25 and applied through ring 23, over the center conductor of the line 22 and through the coupling condenser 80 to the grid or control element of the cathode follower tube 21. The application of the output of tube 21 to the screen or shield 22 through capacitor 81 causes the impedance of the scanning arm 25 to be raised which in turn causes its equivalent capacity to ground and other elements to be greatly reduced. A greater voltage change is thus induced in the scanning electrode 25 for a given voltage applied to the scanning line segments 32, 33, etc.

The cathode follower tube 21 as described above repeats the voltage or potential conditions induced in the scanning electrode 25 to the main scanning amplifier 20. The main amplifier 20 may comprise any suitable form of pulse amplifier including pulse shaping, limiting and other control devices and mechanisms and is shown to comprise two output conductors SX and SO.

As pointed out above, the amplifier 20 should amplify and repeat at least the two different voltage or potential conditions induced upon the scanning element 25 when it passes a busy or an idle line 14, 15, etc.

The amplifier 20 should further be arranged so that either one or the other of two output voltage conditions are applied to each of the output conductors SX and SO. The amplifier 20 should further be arranged so that when one of the output conditions is applied to one of the output leads SX or SO the other output condition is applied to the other of the output leads SX or SO. Thus assume, for example, that when the scanning element 25 passes an idle line segments 32, 33, etc. the amplifier 20 repeats the voltage induced upon the scanning element 25 at this time as a high positive output voltage on the output lead SO and as a low positive voltage on the output lead SX. When the scanning element 25 passes adjacent a segment 32, 33, etc. connected to a busy line 14, 15, etc., the amplifier 20 applies a low positive voltage to the SO output lead and a high positive voltage to the output SX lead.

Figure 4:
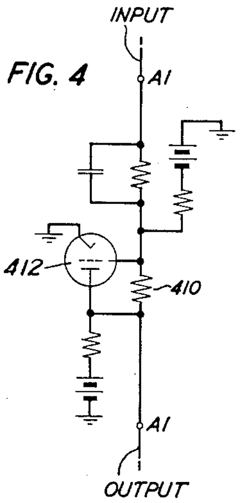
Fig. 4 shows the details of the phase inversion amplifier.
Figure 4A:
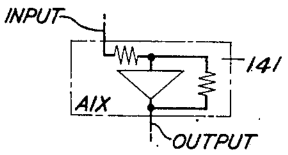
Fig. 4A shows the schematic representation of this apparatus as employed in Fig. 1.

When desired, the alternate output may be obtained from an additional amplifier, not shown, such as 141, 142, 143, etc. employed in combination with the pick-up amplifiers 131 and shown in Figs. 4 and 4A and described herein.

With the line segment 32 connected through resistor 18, resistors 42 and to negative battery 78, the voltage applied to the segment 32 will be at substantially negative battery voltage for the idle condition of line 14 and a more positive voltage will be applied to segment 32 for a busy condition of line 14 due to the voltage drop across resistor 18 when the line circuit 14 to which it is connected is closed. Under these circumstances, the main amplifier 20 should be arranged so that the voltage output on the SX lead substantially corresponds to or has a wave form similar to the voltage induced in the scanning element 25 and the voltage of the output SO lead should have substantially the same wave form but be inverted, or 180 degrees out of phase therewith.

The scanning arrangement will work in an equally satisfactory manner if the line segments 32, 33, etc. are connected to the upper terminal of resistors 16, 17, etc. However, in this case the voltage applied to the line segment 32, 33, etc. for an idle line 14, 15, etc. will be substantially ground potential and for a busy line 14, 15, etc. will be more negative due to the voltage drop across resistor 16, 17, etc. In this case the terminal amplifier 20 must be arranged so that substantially the same wave form as induced upon the pick-up element 25 is repeated to the SO output lead in a similar wave form but inverted or displaced 180 degrees in phase applied to the SX lead.

The line segments 32, 33, etc. may also be connected to either a grounded or battery resistor connected to the line 14, 15, etc. when a positive line battery is employed instead of a negative battery, such as 78 or 79, described herein. It is also within the scope of the invention to connect a positive battery to one of the resistors 16 or 18 and a negative battery to the other and then connect the line segment 32 to either one or the other of the resistors 16 or 18 as may be desired. In each case care must be taken to connect the main amplifier 20 and output leads SO and SX in such a manner that a high positive voltage is applied to the SO lead by the amplifier 20 and a low positive voltage applied to the SX lead in response to the scanning element 25 passing adjacent a segment 32, 33, etc. connected to an idle or open line 14, 15, etc. and a low positive output voltage applied to the SO lead and a high positive output voltage applied to the SX lead in response to the scanning element 25 passing adjacent a segment 32, 33, etc. connected to a busy or closed line 14, 15, etc. It should be noted that the potential of battery 77 to which the shielded segments 30 are connected may control the output voltage or potentials of the SX and SO leads at the time the scanning arm 25 is passing adjacent the shielding elements 30. The output of the amplifier 20, however, is not employed at this time because the timing or synchronizing pulses from amplifier 60 are not received at this time.

Assume now that it is desired to initiate a call over some one of the lines, say line 14, for example. In order to initiate a call over line 14, switch 10 is closed which causes current to flow from battery 78 through resistor 18 over line 14 through switch 10 and signal generator 12 and resistor 16 to ground. Current flowing through resistor 18 causes a voltage or potential difference to appear which is applied to the segment 32 through resistor 42. Consequently, the next time the scanning conductor 25 passes adjacent segment 32 it will have a less negative or more positive voltage induced upon it, which voltage is repeated by the cathode-follower tube 21 and applied to the shield of cable 22 as described above. In addition, the voltage from tube 21 is applied to the scanning amplifier 20 and causes the output on the leads SX and SO to reverse. In other words, the output from SX now assumes its most positive value, and the output voltage applied to the SO lead assumes its least positive or most negative value. It should be noted that normally with the line circuits 14, 15, etc. open, the potential applied to the shielding segments 30 of the distributor or scanning mechanism is substantially the same as the voltage applied to the segments 32, 33, etc. connected to the idle lines 14, 15, etc. with the result that substantially no voltage change is applied to the scanning arm 25 during the time it is scanning an idle line 14, 15, etc. However, when a line 14, 15, etc. is making a call, the voltage of the segment 32, 33, etc., associated with it changes from battery potential and thus causes a change in voltage to be applied to the scanning electrode 25 as it passes the corresponding segment 32, 33, etc.

When the scanning arm 25 passes segment 32 with switches 10 and 12 closed as described above, positive voltage is applied to the SX output lead which is transmitted to the lower lef-hand input of the recording amplifier 121 connected to the combined recording and pick-up coil 111 of the A1 channel. At this time since as described above the magnetic condition within the magnetic material is assumed to be in the direction of O signals, the output of the reading amplifier 131 on the A10 lead will be a high positive signal. Consequently, as the center of the cell of channel A1 assigned to line 14 approaches the center of the pole tips of the coil 111, positive voltage is simultaneously applied to both of the left-hand inputs of the recording amplifier 121. Since these inputs are connected through rectifiers 75 connected so as to oppose positive voltages, when both of the inputs are positive a positive voltage will be repeated to the recording amplifier. As a result, when the cell or elemental area defining and timing negative pulse from the amplifier 60 is applied to the cathode of tube 74 when the cell assigned to line 14 is substantially centered under the pole tips of coil 111, an X signal condition is applied to the recording winding of coil 111 causing an X signal to be recorded in the cell assigned to line 14 instead of an O signal as was previously assumed to be recorded therein. It should be noted that it was first determined that an O signal was recorded in this area and that it was desired to record an X signal therein which signal is then recorded during the same pass of the elemental area under the pole tips of the coil 111.

Assuming the line 14 is still closed when the scanning element 25 again passes adjacent segment 32 connected to resistor 18 in line 14, positive voltage again appears on the SX lead from the scanning amplifier 20 which voltage is likewise applied to the lower left-hand input to the recording amplifier 121. However, at this time an X signal is recorded in the elemental area or cell approaching the pick-up coil 111 with the result that the output of the pick-up or reading amplifier 131 on the A10 lead will no longer be positive. Instead it will be at its more negative or less positive value. Inasmuch as the rectifier 75 connected in series with these input leads on the left is poled in such a direction as to oppose the positive voltages applied to the input leads, it is necessary to have a positive voltage applied to both of these input leads before a positive voltage is applied to the grid of tube 74 associated with the recording amplifier 121. Consequently, during the second pass of the elemental area assigned to line 14 and assuming the line remains closed no further X signals are recorded at this time.

The above-described operation then continues with an X signal recorded in the channel A1 under the combined pick-up and recording coil 111 so long as line 14 remains closed. The X in the individual cell or elemental area of the channel A1 under the coil 111 indicates that the calling line 14 has been closed. This will remain stored in the channel A1 as will be described hereinafter for the duration of the call.

When an X signal previously recorded in the A1 channel passes under head 111 of the A1 channel as described above, the output of the reading amplifier 131 changes from its most positive value to a lower value indicating a previously recorded X signal is then passing under the pick-up coil 111. The output of this reading amplifier 131 in addition being connected to the upper left-hand input to the recording amplifier 121 is also connected to a phase inverter stage 141 which in effect merely inverts the output of the reading amplifier 131. Consequently, when an X is recorded in the elemental area passing under the pole tips of coil 111 the output of the phase inverter 141 will be most positive while the output of the amplifier 131 is least positive. Conversely, when an O signal is recorded in the elemental area passing under the pole tips of the pick-up coil 111, the output amplifier 131 on lead A10 becomes positive and the output from phase inverter on the lead A1X assumes its more negative or less positive value. Thus the outputs on these two leads are at all times substantially opposite to each other. The positive output on the lead A1X at this time produces no useful result because the other inputs to gate circuits 201 and 202 are not positive. Inasmuch as the gate circuits 201 and 202 are of the type that require all of their inputs to be positive before positive potential is applied to their output leads 82 and 83, no further action takes place at this time.

Assume now that line 14 is opened for a short interval of time by the signal transmitting mechanism 12 which may be the telephone dial or other similar equipment, or may comprise any other suitable type of circuit opening and closing device. When line 14 again becomes open the voltage drop across resistor 18 becomes substantially zero with the result that segment 32 again is held at approximately battery potential. Consequently, when the arm 25 again passes adjacent segment 32 the output from the scanning amplifier 20 again reverses so that at this time a high positive voltage is applied to the SO lead and a low positive voltage applied to the SX lead. Likewise, as described above, an X signal was recorded in the elemental area then starting to pass under the pole tips of the coil 111 with the result that a high positive voltage is also applied to the A1X lead. Thus with positive voltages applied to both of the input leads of the gate circuit 201 positive voltage is applied to the output lead 82 which extends to the timing or counting circuit 270 and also to the lower left-hand input to the recording amplifier 122. In addition, an O signal was previously recorded in the elemental area assigned to line 14 which is starting to pass under the pole-pieces of the recording coil 112 at this time with the result that positive voltage appears on the output lead A20 from the reading amplifier 132. Thus at this time positive voltage is applied to both the left-hand input leads to the amplifier 122. Consequently, at about the time the cell of the channel under pick-up coil 112 assigned to line 14 becomes centered under the pole-pieces of coil 112 a negative timing or synchronizing pulse is applied to the cathode of tube 84 associated with the recording amplifier 122 from the timing synchronizing amplifier 60 which pulse in turn causes a voltage to be applied to recording windings of coils 112 and records an X signal in the elemental area in channel A2 assigned to line 14.

On the next revolution of the drum 104 and assuming that line 14 still remains open the X signal recorded by coil 112 will again pass under the pole tips of this coil and cause a low positive, or more negative voltage, to be applied to the output A20 of the reading amplifier 132. The positive voltage applied to the left-hand lower input to amplifier 122 is no longer capable of causing a signal to be recorded by coil 112 in response to the applied synchronizing pulse. Thereafter so long as line 14 remains open, the system remains in the condition described above with the X signal recorded in the A1 channel indicating that the calling line 14 had been closed and the X signal now recorded in the A2 channel indicating that the line 14 is now open.

The positive signals applied to the output of the gate circuit 201 during each revolution of the drum 104 during which the line 14 remains open are transmitted to the counting or timing circuit 270 and employed as a disconnect or termination signal as will be described hereinafter.

However, assume that before sufficient revolutions have occurred, during which line 14 is open, to constitute a termination or disconnect signal, line 14 is again re-closed. As a result, current again flows through resistor 18 and produces a voltage drop thereacross so that the next time scanning element 25 passes adjacent segment 32, the output of the scanning amplifier 20 again reverses and a high positive voltage is applied to the SX lead and a low positive or negative voltage is applied to the SO lead.

At about this same time the X signals recorded both in the A1 and A2 channels start to pass under the respective coils 111 and 112 and cause high positive voltages to be applied to the A1X and A2X leads. These leads extend to gate circuit 202 as does the SX lead. Consequently, a high positive voltage is applied to all three inputs of the gate circuit 202 at this time with the result that a high positive voltage is applied to the output 83 of the gate circuit 202 and thus to the lower left-hand input to the recording amplifier 123 of the B1 channel and to the lower right-hand input to amplifier 122.

At this same time the elemental area assigned to line 14 in the B1 channel also starts to pass under the pick-up coil 113. Inasmuch as an O signal is recorded in this elemental area at this time, a high positive voltage is applied to the B1O lead from the reading amplifier 133 and thus to the upper left-hand input to the recording amplifier 123 of the B1 channel. As a result of the simultaneous application of positive voltages to both of the left-hand input terminals of the recording amplifier 123 an X signal is recorded in the B1 channel in response to the negative synchronizing or timing pulse from amplifier 60 at about the time the cell of the B1 channel assigned to line 14 becomes centered under the pole tips of the coil 113 of the B1 channel. As a result an X signal is recorded in the cell of the B1 channel assigned to line 14.

In addition, the application of a high positive voltage to the lower right-hand input of amplifier 122, as described above, causes an O signal to be recorded or written over the X signal previously recorded by the combined pick-up and recording coil 112 in the elemental area of the A2 channel assigned to the line 14.

Consequently, assuming line 14 to remain closed and until the register circuits 1000 respond to the X signal recorded in the elemental area of channel B1 assigned to line 14, as will be described hereinfter, each time line 14 is scanned a high positive voltage is applied to the SX lead and a low positive voltage to the SO lead; a high positive voltage is applied to the A1X lead and a low positive voltage to the A1O lead; a low positive voltage to the A2X lead and a high positive voltage to the A2O lead; and a high positive voltage to the B1X lead and a low positive voltage to B1O lead. These voltages are incapable of causing any further signals to be recorded in any of the elemental areas of the respective A1, A2 or B1 channels.

In the above description the operation of the system in response to signals received over line 14 only has been considered in detail. It is to be understood that the system operates in substantially the same manner for signals received over any other line such as line 15. It is also to be understood that the signals may be received from these lines substantially simultaneously or in any relative time or phase displacement. However, since the scanning speed is such that each of the lines 14, 15, etc. is scanned at intervals which are shorter than the shortest signaling condition desired to be recognized on any of the lines 14, 15, etc., the scanning equipment will scan each of the lines 14, 15, etc. in succession and record the particular signaling condition thereon in the elemental areas of the drum 104 assigned thereto before the signaling condition has had time to change to a succeeding signaling condition. Thus the signals may originate on the lines 14, 15, etc. in any random manner but the lines 14, 15, etc. are scanned in succession and the signals received therefrom recorded in the drum 104 for each of the individual lines 14, 15, etc. in substantially the same manner as described above in detail with reference to line 14.

Any of the above signals or sequences of signals, i. e., closure of the calling line, closure of the calling line followed by the opening thereof, or the closure of the calling line followed by an opening of that line, which opening is followed by a reclosure of the line, may comprise a calling signal and the exemplary embodiment described in detail herein may be arranged to recognize and respond to any or all of the above calling signals. As shown in Fig. 1 the input to the register and display apparatus 1000 described hereinafter is connected to the B1X output lead from the amplifier 143 of the B1 channel. Consequently, the display and recording equipment 1000 when connected as shown in Fig. 1 responds to the last above enumerated sequences of signals; i. e., closure of the line followed by an opening of the line which is less than a predetermined interval of time followed by a reclosure of the line. However, by connecting the input lead to the recording and display apparatus 1000 to the A1X or A2X leads instead of the B1X lead, the system will respond to the other signals or sequences. When desired, additional register and display equipment may be provided and connected to different ones of the channels A1, A2, etc. for responding to different types of call signals.

In order to display the call it is necessary that the display or registering mechanism 1000 is idle and properly reset to a zero condition. This registering equipment as shown in Fig. 1 comprises a plurality of counter tubes 1011, 1012, etc., reset multivibrator tube 1050, a group of registering tubes 1040, 1041, etc., indicating tubes 1070, 1071, etc., and reset tubes 1060, 1061, etc. A control and combining circuit comprising the diodes 153, 154, 155 and 156 together with a repeating cathode-follower tube 911 is provided for controlling the registering equipment. The restoring multivibrator tube 1050 is arranged so that with key 1051 unoperated as shown in the drawing the left-hand section will be conducting and the right-hand section non-conducting due to the connection of a grid of the left-hand section to a more positive bias voltage than applied to the grid of the right-hand section. Under these circumstances the voltage of the anode of the left-hand section of tube 1050 is at a relatively low value so that the right-hand sections of gates 731, 732, etc., connected thereto are ineffective at this time. The voltage of the anode of the right-hand section of tube 1050 is at its most positive value when the right-hand section is conducting substantially no current. As a result, a high positive voltage is applied to the upper terminal of diode 154, which voltage is in such a direction that it produces no current flow through the diode 154 because it is in a reverse direction to the mode of easy conduction of the diode 154.

The counter tubes 1011 and 1012 represent two stages of a multistage binary counter employed to designate the line 14, 15, etc. over which the calling signal or signals originate. In the binary number system each place or denominational order of a number has either one of two different digits, i. e., a one or a zero. These counter stages are arranged to be reset once per revolution of the drum 104 as will be described hereinafter. Thereafter they count each of the synchronizing pulses which define the unit areas individual to the respective lines 14, 15, etc. In the exemplary embodiment of the present invention a synchronizing pulse is generated for and defines each of the elemental areas under the pick-up coils 111, 112, 113, etc. assigned to the individual calling lines 14, 15, etc. The elemental areas assigned a line 14, 15, etc. are under the various pick-up coils 111, 112, 113, etc. as described above when the arm 25 passes the segment 32, 33, etc. connected to that line. Consequently, the condition of the counter tubes 1011, 1012, etc., accurately identifies the line 14, 15, etc. having elemental areas under the various pick-up coils 111, 112, 113, etc. at each instant of time.

The counter tubes 1011 and 1012 have been arranged so that they are reset to their zero or initial condition once per revolution by a negative pulse applied to them as will be described hereinafter. When the tubes 1011 and 1012 are in their initial or zero condition, it is assumed that the right-hand triodes thereof are conducting current between anode and cathode but that no current flows in the anode path of the left-hand sections thereof.

The synchronizing or timing pulses from amplifier 60 after passing through the delay line or device 291 and the repeating and inverting tube 290 are applied to both sections of tube 1011 through the coupling condenser 1015 and the two diode rectifiers 1001 as shown in the drawing. The plate of tube 290 is connected to battery 1002 through resistor 1003 and the cathode is connected to ground through resistor 1004 and condenser 1005. The timing pulses as received from amplifier 60 through the delay line 291 are of a positive polarity. These delayed pulses are repeated by tube 290 as negative pulses and applied to the two coupling diodes 1001. The diodes 1001 are poled in such a direction as to offer a low resistance or impedance to negative pulses. It is assumed that the diodes 1001 have a sufficiently low back resistance to bias the mid-point between them to a voltage between the voltages of the two anodes to which they are connected. If high vacuum diodes are used it will be necessary to bias the mid-point between them to a suitable voltage.

Under the assumed conditions with the right-hand section of tube 1011 conducting current, its anode will be at a lower voltage than the anode of its associated left-hand section. Consequently the diode 1001 connected to this right-hand section will offer appreciably more impedance to the pulse than will the diode 1001 connected to the left-hand section. Furthermore, the application of a negative pulse through this right-hand diode 1001 to the anode of the right-hand section of tube 1011 and then through the coupling network 1006 to the control grid of the left-hand section produces no appreciable effect upon either section of this tube. However, the application of the negative pulse to the left-hand anode of tube 1011 and then through the resistor-condenser network 1008 to the control grid of the right-hand section of tube 1011 tends to reduce the current flowing in the right-hand section. As a result the voltage of the anode of the right-hand section tends to rise or become more positive and applying more positive voltage to the control grid of the left-hand section of tube 1011 which tube then starts to conduct current and as a result its anode voltage falls tending to make the grid of the right-hand section still more negative. Consequently, the current previously flowing through the right-hand section of tube 1011 is interrupted and the current flow through the left-hand section initiated.

Under these circumstances tube 1011 indicates a count of one and remains in the above-described conducting conditions wherein current flows through the left-hand section but not through the right-hand section until the next timing pulse is applied to both sections.

The second delayed timing negative pulse is again applied to both anodes of tube 1011 in the same manner as above described. At this time, however, current flowing through the left-hand section is interrupted due to a negative pulse transmitted from the anode of the right-hand section of tube 1011 and the coupling network 1006 to the control grid of the left-hand section. As a result of the consequent decrease in current flowing through the left-hand section, positive voltage is applied to the control grid of the right-hand section which causes current to start to flow through this section.

Thus, upon the application of each of the delayed negative timing pulses the conducting conditions in tube 1011 are reversed.

The initiation of a discharge through the right-hand section of tube 1011 causes the voltage of the anode of this section to fall from substantially the full anode battery supply voltage to a much lower voltage which in turn applies a negative pulse through the coupling condenser 1007 and the rectifiers or diodes 1009 connected to the two anodes of tube 1012. Under the assumed conditions, prior to the application of this negative pulse, the right-hand section of tube 1012 is conducting current while the left-hand section is not. The application of the negative pulse to the two diodes 1009 does not at once effect the cut-off of the right-hand section. However, the application of the negative pulse through the diode 1009 connected to the anode of the left-hand section and then through the coupling arrangement 1020 to the control grid of the right-hand section reduces or interrupts the current flowing to the right-hand section of tube 1012. The potential upon the anode of the right-hand section increases and applies a positive voltage to the grid of the left-hand section which then starts to conduct current and apply a still more negative voltage to the grid of the right-hand section. In this manner the application of the negative pulse through the coupling condenser 1007 and coupling diodes 1009 causes the current flowing through the right-hand section of tube 1012 to be interrupted and a flow of current from the left-hand section initiated.

Had the left-hand section of tube 1012 been conducting current instead of the right-hand, then the application of the negative pulse would be transmitted through the opposite diode 1009 and cause the interruption of the current flowing through the left-hand section and an initiation of current flowing through the right-hand section. In other words, upon the application of each negative pulse from the anode of the right-hand section of tube 1011, the discharge current within the tube 1012 is transferred from the previously conducting section to the other section. In a similar manner, each time the anode of the right-hand section becomes more negative due to the initiation of a flow of current through the right-hand section of tube 1012, a negative pulse is relayed to the next counter stage and so on.

With the right-hand section of tube 1011 conducting and the left-hand section of tube 1012 conducting, these two tubes indicate a count of 2, since two synchronizing pulses have been applied to the cathodes of tube 1011 as described above.

It should be noted that the counter tubes 1011, 1012, etc. are advanced by delayed timing pulses. In other words, the counter tubes 1011, 1012, etc. are not advanced until the undelayed timing pulses through the connection 1022 have controlled the gate circuits 731, 732, etc., in a manner described hereinafter. Consequently, the timing pulses control the gate circuits 731, 732, etc and accurately indicate the setting of the counter tubes 1011, 1012, etc. in a manner described hereinafter before the counter tubes 1011, 1012, etc. are advanced by the respective delayed timing pulses.

In a similar manner additional synchronizing pulses are counted by tubes 1011, 1012 and similar tubes not shown in the drawing but provided when necessary. Thus the setting of the conducting conditions of the counter tubes of 1011, 1012, etc, at all times accurately represents the identity of the calling line 14, 15, etc. being tested or scanned at each instant of time.

Tubes 1040 and 1041 are gas-filled tubes having a gas pressure of a fraction of an atmosphere and in which the control grid loses control of the current flowing in the anode-cathode circuits once this current starts to flow. The tubes 1040 and 1041 are initially set or conditioned with no current flowing in their anode-cathode circuits and are restored to this condition after each call has been recorded and noted as will be described hereinafter. With each of the tubes 1040, 1041, etc., non-conducting their anodes are at a relatively high positive voltage. However the diodes 155, 156, etc., are connected to the respective anodes of tubes 1040 and 1041 in the direction to oppose the flow of current through these diodes. However, at this time the common terminal of the combining circuit which is connected to the grid of tube 911 is maintained at a relatively low voltage by the output of amplifier 143 until an X signal recorded in channel B1 is picked up by the corresponding pick-up coil 113.

Upon the next revolution of the drum 104 after the X signal is recorded in channel B1 the output of amplifier 143 will have a positive voltage applied to its output B1X due to the X signal recorded in this channel of the magnetic drum 104.

Under the assumed conditions the positive voltage on the lead B1X from amplifier 143 is the last positive voltage to be applied to the diodes 153, 154, 155 and 156 with the result that the voltage of the common conductor of this combining circuit becomes positive and tube 911 repeats a high positive voltage in this output or cathode circuit to diodes of the gate circuits 731, 732, etc., and also to lower right input circuit of amplifier 123 of the B1 channel.

The application of a high positive voltage to the lower right input circuit of amplifier 123 causes an O signal to be recorded over the X signal previously recorded in the elemental area of channel B1 assigned to line 14 and thus cancel the previously recorded X signal indicating a call. In addition, and before the response to the X signal disappears, the application of a high positive voltage to the gate circuits 731, 732, etc. causes the register circuits comprising tubes 1040, 1041, etc. to display the identity of the calling line 14, 15, etc. thus indicating that a call has been received and the identity of the line over which it is received by displaying the condition of the binary counter at the time a high positive voltage is repeated by tube 911. If the corresponding counter tube 1011, 1012, etc. indicates a 1, the right-hand sections will be non-conducting and thus have their anodes at a relatively high voltage. If, on the other hand, these counter tubes indicate a count of zero the right-hand section will be conducting and its anode at a correspondingly low voltage with the result that the left-hand sections of gates 731 and 732 are substantially blocked or ineffective to transmit a positive voltage to their common or output terminal.

Thus, during the time the X signal recorded in channel B1 passes under the pick-up coil 113 and causes a positive voltage to be applied to the output lead B1X from amplifier 143, positive voltage will be applied to all of the input terminals on the left-hand side of the gate circuits 731, 732, etc., when the synchronizing pulse occurring at this time is received from the pick-up coil 50 and amplifier 60. As a result, the tubes 1040, 1041, etc., which are individual to the counter tubes 1011, 1012, etc., which indicate a count or digit value of 1 have a positive voltage applied to their control grids. The tubes 1040 and 1041 individual to counter tubes 1011, 1012, etc., which are in their original or initial condition, that is, indicating a digit value of zero, do not have a positive voltage applied to their control grids. Consequently, discharges are initiated through the register tubes 1040, 1041, etc., at this time if a corresponding counter tube is in its operated condition and not initiated if the corresponding counter tube is in its initial or zero condition. Consequently, the register tubes 1040, 1041, etc., have discharges initiated through them in accordance with the count of the binary counter and thus designate or identify the calling line which is assumed to be line 14.

Generally, the count of the binary counter which identifies the respective calling lines will not be the directory number of the calling line but may be such number or represent such number when desired.

Indicating devices 1070 and 1071 are connected in the cathode circuits of tubes 1040 and 1041 and have discharges initiated through them at substantially the same time discharges are initiated in the corresponding register tubes 1040 and 1041, thus indicating to an attendant the identity of the calling line. It is to be understood of course that relays, switches or other indicators or other types of mechanisms may be employed in addition to or in place of the gas tube indicators 1070, 1071, etc., for indicating the identity of the calling line for responding to the call from the calling line in any desired manner. These responsive devices may actuates other switching devices, signals, buzzers, lamps and the like.

In addition, the initiation of a discharge through the register tubes 1040, 1041, etc., causes the anode of the tubes through which discharge is initiated to fall to a relatively low voltage with the result that the voltage applied to the diodes 155, 156, etc., also falls to a relatively low value. Consequently, the voltage applied to the grid of tube 911 also falls to this low value so that the output of tube 911 is no longer sufficient to permit positive voltages to be transmitted through the gate circuits 731, 732, etc., and as a result the register tubes 1040, 1041, etc. will remain in the condition indicating the identity of a calling line until restored by an attendant or by other means.

When it is desired to restore the register circuits including tubes 1040, 1041, etc., described above to their initial or zero condition, after the register circuits have been observed, key 1051 will be operated which applies a more negative voltage to the grid of the left-hand section of tube 1050 for a short interval of time during the charging time of the small condenser 1052. As a result of the cross couplings of the monostable circuits of tube 1050 the current flowing through the left-hand section is interrupted and current flows through the right-hand section thereof. As a result, the voltage applied to the diode 154 is reduced so that further signals or high positive pulses received over conductor B1X cannot be relayed to the grid of tube 911, even if and when the other input controls described herein would otherwise permit pulses to be repeated from conductor 148 to the grid of tube 911. In addition, the voltage of the left-hand anode of tube 1050 becomes more positive and is applied through the right-hand treminals of gates 731, 732, etc. As a result, positive voltage is applied to the grids of the restoring tubes 1060, 1061, etc., during the application of synchronizing pulses to the gate circuits 731, 732, etc.

The application of positive voltages to the control elements of tubes 1060 and 1061 causes these tubes to conduct current with the result that the voltage of their anodes and the anodes of the register tubes 1040, 1041, etc., is reduced to a low value. The voltage of the cathodes of the register tubes 1040, 1041, etc. is maintained at the voltage resulting from the discharge current flowing through the cathode resistors 1024, 1025, etc. by the condensers 1026, 1027, etc. The reduction of the anode voltage of these tubes 1040, 1041, etc., is sufficient to reduce the voltage between the anodes and cathodes of these tubes, below the sustaining voltage. As a result, the discharge through the register tubes 1040, 1041, etc. is interrupted and the register circuit restored to normal. Likewise, the indicating tubes 1070 and 1071 are also restored to normal, thus canceling the identification of the previous calling line 14, 15, etc.

Thereafter, as coupling condenser 1053 continues to charge the voltage of the grid of the left-hand section of tube 1050 approaches the voltage of the grid of the right-hand section. When these two grid voltages differ by less than the magnitude of the negative pulses as applied to the cathodes of both sections of tube 1050 the next delayed negative synchronizing or timing pulse applied to the cathodes of tube 1050 causes the grid-to-cathode voltage of the left-hand section to pass the value required to initiate a flow of current through the left-hand section of tube 1050. Due to the cross connections between the sections of tube 1050, the current flowing through the right-hand section is therefore interrupted. As a result the voltage of the anode of the left-hand section falls to a relatively low value so that no further pulses are transmitted through the right-hand terminals of the gate circuits 731, 732, etc. In addition, the voltage of the right-hand section of tube 1050 rises so that positive voltage is applied to the diode 154 thus indicating that the register circuit is again in condition for responding to other X signals recorded in channel B1.

The X signals recorded in the elemental areas assigned to any line in the various channels as described above may be cancelled or removed by applying O signals to the corresponding recording amplifiers 121, 122, 123, etc. in response to the opening of key 10 of line 14, for example, or the corresponding keys of other lines.

As pointed out above, when line 14, for example, is open, after having been closed, a high positive voltage is received over the SO lead from the scanning amplifier 20 each time the scanning element 25 passes adjacent the corresponding line segment such as segment 32 and, in addition, a high positive voltage is received over the A1X lead in response to the X signal previously recorded in the elemental area of the A1 channel assigned to the line such as line 14. As a result a high positive voltage is repeated in the output circuit 82 in the gate 201 to the lower left-hand input to amplifier 122 as described above and also to the timing circuit 270.

Timing circuit 270 may be similar to the corresponding timing circuit described in the above-identified application of Brooks et al. which includes additional channels and related equipment of the magnetic drum. The timing circuit 270, of course, is required to count the number of such positive pulses received each time the line in question, namely line 14, is scanned and after a predetermined time or number of such pulses the timing circuit 270 will apply a high positive voltage to the upper right-hand inputs to the recording amplifiers of each of the channels, such as 121, 122, 123, etc. and cause O signals to be recorded over the X signals previously recorded in these channels thus canceling the call and the signals recorded in response thereto and thus restoring the storage elements assigned to the line in question to their initial or idle condition. It should be pointed out that the timing device 270 is required to keep track of the number of times each and all of the lines 14, 15, etc. are scanned when each of the lines is opened after having been previously closed. This, in effect, requires a timing circuit or similar device for each of the lines or at least one or more channels of a magnetic drum in each of which an elemental area is assigned to each of the lines in a manner similar to that described in the above-identified copending application of Brooks et al.

It is thus evident that the calling arrangement described is capable of recording a call originating on any one or more of a plurality of lines and then register and indicate this fact and the identity of the line over which the calling signals originated. That portion of the equipment required to indicate these signals may later be restored to normal whereupon it is ready to register and indicate the signals received over another line the elemental areas of which have a complete series of signals recorded in them and which next pass under the pole tips of the pick-up coils. The identity of this line is also indicated.

It is also evident that calls from all of the lines may all be substantially simultaneously recorded by the magnetic recording equipment and the associated electrostatic scanning or distributor mechanism.

Figure 3:
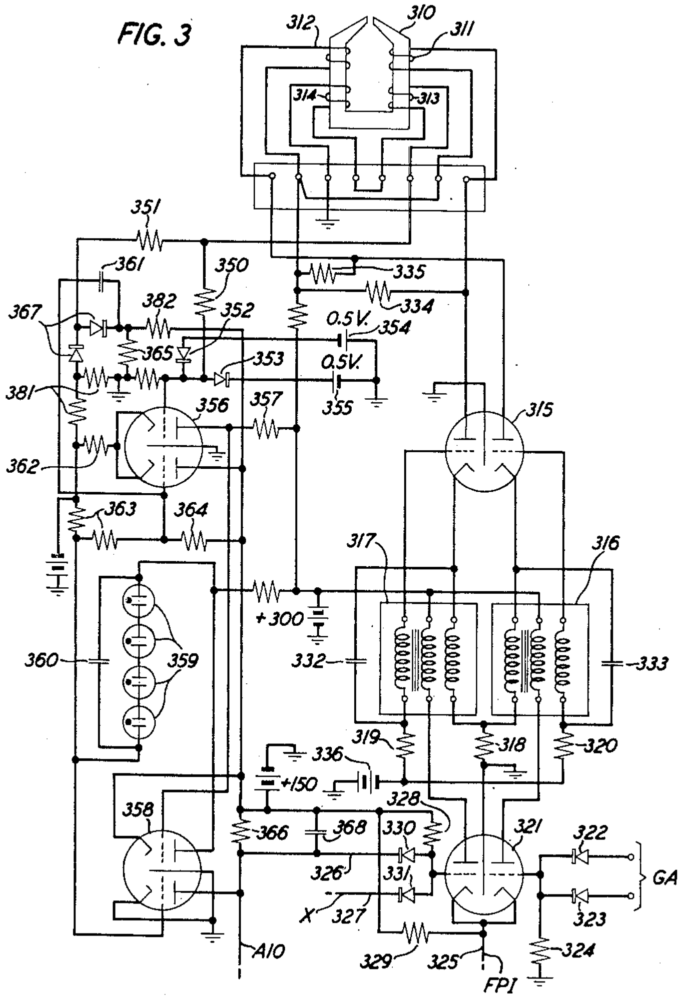
Fig. 3 shows in detail improved recording and reading amplifiers suitable for use in combination with applicants' combined recording and pick-up coil.
Figure 3A:
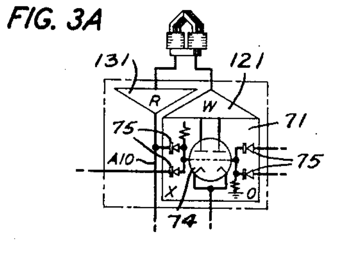
Fig. 3A shows the schematic representation of the circuits and apparatus of Fig. 3 employed to represent such apparatus in Fig. 1.

Typical circuits suitable for the recording or writing amplifier 121, 122, 123, etc. and the pick-up or reading amplifier 131, 132, 133, etc. are shown in detail in Fig. 3 together with a detailed showing of the core structure and the windings interlinking the core structure of the pick-up and the recording coil. Fig. 3A shows a schematic version of Fig. 3 and is the showing employed in Fig. 1 to represent the circuits of both the reading and writing amplifier shown in Fig. 3.

The coil core is illustrated by 310 and has two pole-pieces pointing upwards which are positioned adjacent to but not in contact with the drum 104 which is not shown in Fig. 3. This core structure 310 is provided with four different windings 311, through 314, two on each of the sides of the core. The winding 311 is connected to the anode of the left-hand section of tube 315 and is employed to write or record X signals in the drum 104. Winding 312 is connected to the anode of the right-hand section of tube 315 and is employed to write or record O signals in the magnetic drum. Both sections of tube 315 are normally biased to cut-off by the grid bias battery or other source of energy 336 which normally maintains the grids of both sections of tube 315 sufficiently negative to prevent appreciable current from flowing in the anode-cathode paths of these sections of tube 315. Each section of tube 315 is connected as a blocking oscillator by means of the coupling coils 316 and 317 as well as the related resistors such as 318, 319 and 320. The input circuit to initiate operation of either of the blocking oscillators comprises a winding on the blocking oscillator coils which are connected to the output or anode circuits of the gate tube 321 which is designated as tube 74 in Figs. 1 and 3A. The voltage of the cathodes of both sections of the gate tube 321 is chosen with respect to the bias voltage of the grids of these sections so that substantially no current flows in the anode-cathode paths of either section of this tube. In order to record either an X or an O signal it is necessary to apply a proper voltage condition to the input leads to the gate circuits and then a negative synchronizing pulse to the cathodes of both sections of tube 321. The right-hand section of tube 321 is employed as a gate circuit for initiating operation of the right-hand blocking oscillator of tube 315. The right-hand section of tube 321 is in turn controlled by voltages applied to a plurality of input circuits. Each of these input circuits is coupled to the grid of the right-hand section of tube 321 in such a way that positive voltage applied to any one or more of the input leads causes the grid to become sufficiently positive so that upon the application of the next synchronizing pulse to the cathode of both sections of tube 321 sufficient anode current flows through the right-hand section to initiate the operation of the right-hand section of tube 315 through the coupling of the blocking oscillator coil 316. When current flows through the middle winding of this coil as shown in Fig. 3 due to current flowing in the right-hand section of tube 321 as described above a sufficiently positive voltage is induced in the right-hand winding of coil 316 to initiate the flow of current through the anode-cathode path of the right-hand section of tube 315. This current flows through both the left-hand winding of the blocking oscillator transformer 316 and resistor 318 as well as in the anode circuit of the right-hand section of tube 315. As a result a more positive voltage is induced in the right-hand winding of coil 316, thus tending to further increase the current flow through the right-hand section of tube 315. As a result the current flowing through the right-hand section of tube 315 builds rapidly up to its substantially maximum or saturation value and then falls to a lower value. This current also flows through the left-hand upper winding 312 of the pick-up and recording core structure 310 causing an O signal to be recorded in the elemental area of the magnetic drum then passing adjacent the pole tips of the core structure 310. The output current of tube 315 in passing through the common cathode resistor 318 causes the voltage of the cathode of the left-hand section of tube 315 to become more positive so that even though an attempt is made to write an X signal in the drum in substantially the same space immediately after the above-described operations take place to write an O signal the bias on the left-hand section of tube 315 will be sufficiently negative, due to the voltage drop across resistors 318, that substantially no current flows through the left-hand section of tube 315 and as a result the writing of the O signal is not interfered with. Thereafter, the voltage of the cathode of the right-hand section will return to its normal value under control of condensers 332 and 333 and resistors 319 and 320 and the related circuits so that after a predetermined interval of time after the termination of the pulse or surge of current employed to write an O signal the recording amplifier circuits are restored to their normal or initial condition in which they are ready to record either an X signal or an O signal as may be required.

When it is desired to record an X signal, positive voltage must be applied to lead 327 and through the rectifier or diode 331 connected to the grid of the left-hand section of tube 321. The rectifier 331 is connected in such a direction as to oppose the flow of a positive pulse through it to the grid with the result that the positive pulse is not transmitted to the grid unless and until the voltage applied to the conductor 326 also becomes sufficiently positive in a manner to be described herein. In other words, a sufficiently positive voltage must be applied to both conductors 326 and 327, which are connected through the rectifiers 330 and 331 to the grid of the left-hand section of tube 321, before the positive voltage is repeated to this grid circuit. However, when both of these leads are positive and a negative synchronizing pulse is applied to lead 325 connected to both cathodes of tube 321 current flows through the output circuit of the left-hand section of tube 321 and through the middle winding of the blocking oscillator coil 317. The current flowing through this input winding induces a voltage in the left-hand winding of coil 317 which voltage is in a direction to cause current to flow through the left-hand section of tube 315. Current flowing in this section also flows through the right-hand winding of coil 317 and the resistor 318 with the result that a still more positive voltage is induced in the left-hand winding of coil 317 so that the current flowing through the left-hand section of tube 315 increases to substantially its maximum or saturation value very rapidly and then later decreases at the end of the pulse. This current flows through the right-hand winding 311 of the pick-up and recording coil in core structure 310, and produces a flux between the pole-tips in the opposite direction to the flux produced by the current through coil 312 to record an O signal, thus causing an X signal to be recorded in the elemental area of the drum then passing under the pole-pieces of the core structure 310. The output current flowing through resistor 318 increases the negative grid-cathode bias of the right-hand section of tube 315 so that the right-hand section of this tube cannot be rendered conducting by any voltage repeated from the right-hand section of tube 321 with the result that should the input conditions to the gate circuits change as the result of writing the X signal as will be described hereinafter, the right-hand section of tube 315 is nevertheless prevented from conducting current at this time due to the voltage drop across the resistor 318, thus preventing interference with the writing of an X signal in the drum or the portion thereof then passing adjacent to the pole-pieces of the core structure 310.

The duration of the recording or writing pulses are controlled in part by the time constants of the coils 316 and 317 and related circuits and apparatus including the shunting condensers 332 and 333. After the termination of a discharge through either section of tube 315 the voltage of the cathodes in both sections tends to return to normal. The time required to return to normal is controlled by condensers 332 and 333 together with the various circuit resistors and other devices. Each one of the recording windings has a shunt resistor such as 334 and 335 to absorb the energy stored in the core structure as rapidly as possible and thus damp out oscillatory surges due to the self-resonance of the coil so that the core structure will have its magnetization returned to normal and be available for reading or picking up signals stored in the next succeeding elemental area of the magnetic drum when this area approaches and passes under the pole tips of core 310.

The flux through the core structure of the combined reading and writing head is relatively low during the time the reading operation takes place so that a large amount of amplification is required in the reading amplifier 131. When, however, it is desired to write or record on the magnetic surface, a high flux, approaching saturation, is required in the core structure 310 of the combined reading and writing head. After writing or recording a sufficient time interval must elapse for this flux to be dissipated before the head can be employed to read a magnetic condition of a succeeding elemental area in the same track.

The arrangement, as described above, to expedite the decay of flux in the head, utilizes terminating resistances 334 and 335 connected across the windings 311 and 312, respectively, to damp out the flux as rapidly as possible.

The receiving amplifier which comprises tubes 356 and 358 must meet a number of severe requirements. The input of this amplifier is connected to pick-up or receiving windings of the core structure 310 which have induced in them a small voltage of the order of 0.15 volt in response to the X signal passing under the pole tips in the core structure 310. After an X signal has been recorded in the magnetic material and then erased or an O signal recorded over the X signal, the ouput from the reading or pick-up windings 313 and 314 does not return to zero but is of the order of 1/10 to 1/4 or 1/3 of the output when an X signal passes under the pole tips of the core 310. When an X signal passes under the pole tips, it is desired to have the amplifier fully respond thereto, while no output is desired if an O signal passes under the pole tips.

Furthermore, inasmuch as the amplifiers are connected to these windings at all times, a very much greater voltage is received from the pick-up windings when either an X signal or an O signal is recorded by the recording amplifier in the manner described above due to the fact that the recording windings are inductively coupled to the pick-up windings because they are all wound about the same core structure.

It is to be noted that immediately following the writing of signals in any one of the elemental areas or cells of the drum 104, it is desired to have the pick-up or reading amplifier respond to the signal recorded in the next succeeding elemental area or cell.

Inasmuch as considerable gain is required to amplify the signal of the order of 0.15 volt to obtain an output of the order of 50 volts or more, a plurality of amplifying stages must be provided. In order to protect the first stage and permit satisfactory operation thereof, the input to the amplifier from the pick-up windings 313 and 314 of the recording and pick-up coil is connected through a relatively high resistance 350 to the grid circuit of the upper section of tube 356. A pair of rectifiers, diodes or crystals 352 and 353 are also connected to the grid circuit of the upper section of tube 356. The other terminals of these rectifiers are connected to batteries or other suitable sources of voltage of approximately minus and plus a half volt respectively. These voltages are connected in such a direction that the rectifiers oppose the flow of current due to these voltages. As a result the rectifiers 352 and 353 in these circuits have a high impedance to the flow of any current through them. However, when the signal voltage exceeds approximately one-half volt plus or minus, the impedance of one or the other of the rectifiers changes to a low value so that the voltage of the grid of the first tube remains substantially plus or minus a half volt from ground. When this voltage is amplified by the tube, however, the succeeding stage or stages in all probability will be driven to or beyond saturation or cut-off so that if the usual type of capacity and resistance couplings are employed, rectification takes place at the grid circuit or elsewhere so that energy becomes stored in the condenser or other coupling apparatus which energy requires too long a time to be dissipated and will thus interfere with the reacting of and response to the next recorded signal. In order to overcome this difficulty, direct connections or direct couplings are employed between stages because such connections between stages of an amplifier do not require any energy storage device. As a result succeeding stages may be conditioned to respond to a weak signal a very short length of time after the recording pulse of previous signaling is removed. The time for a stage to return to normal after a pulse has been read is called the normalizing time of the stage.

However, direct coupled amplifiers are subject to a drift and other undesirable phenomena which is particularly objectionable in the amplifier required to respond to the output from the pick-up coil because this drift would interfere with the threshold or biasing level amplifier, thus varying the level at which the amplifier distinguishes between X signals and O signals recorded in the magnetic drum or other magnetic material. The effects of such variations are substantially eliminated in the reading or pick-up amplifier shown in Fig. 3 by employing a large amount of negative feedback. As shown in Fig. 3, the output or anode of the upper section of tube 356 is directly coupled to the control element or grid of the upper section of tube 358. It should be noted that the cathode of tube 356 is connected through resistor 362 to a terminal of a source of voltage which is negative with respect to ground, while the cathode of the upper section of tube 358 is connected to a terminal of a source of voltage or battery which is about 150 volts positive with respect to ground. The anode of the upper section of tube 358 is connected through gas diodes 359 to the control grid of the lower section of tube 358 which tube forms the output tube of the amplifier. The grid of the lower section of tube 358 is also coupled through voltage dividing resistor networks 363 and 364 to the control grid of the lower section of tube 356. Inasmuch as both sections of tube 356 have a common cathode resistor the voltage applied to the grid of the lower section of this tube is introduced into the grid cathode circuit of the upper section in the reverse phase. Thus, a positive voltage applied to the grid of the upper section of tube 356 is repeated as a negative pulse or voltage on the anode of this tube which in turn is repeated as a positive voltage by the anode of the upper section of tube 358. This positive voltage is then coupled to the grid of the lower section of tube 356 which causes the cathode of both sections of tube 356 to become more positive. The fact that the cathode of the upper section of tube 356 becomes more positive tends to reduce the grid-to-cathode voltage and thus acts as a negative feedback circuit. By making the constants of the circuits such that the loss of the feedback path is low or almost zero to direct current, tube variations, battery variations and other variations which tend to cause the drift of direct coupled amplifiers are substantially eliminated.

The coupling network in the exemplary embodiment shown in the drawing comprises four cold cathode gas tubes 359 which tubes are shunted by capacitor 360. This coupling network provides substantially direct coupling and at the same time, due to the substantially unvarying voltage existing across these tubes, provides the proper bias for the grids of the lower sections of tubes 356 and 358. Cold cathode gas discharge tubes when conducting have a substantially constant voltage across them which is substantially independent of the current through them. Such tubes when used to couple amplifier stages transmit substantially all the voltage variations from one stage to the next but at a constant voltage difference. Such a network thus provides substantially direct coupling without appreciable energy storage from the anode of the upper section of tube 358 to the grids of the lower sections of tubes 356 and 358, and at the same time permits the proper bias voltages to be maintained on these tube electrodes.

Thus, due to the large amount of feedback at direct current or substantially zero frequency the grid of the lower section of tube 358 is maintained at a substantially constant direct-current voltage or bias substantially independently of battery and tube variations. This bias is so arranged that the lower section of tube 358 is biased below cut-off by about a third of the entire voltage change of this grid in response to an X signal approaching the pole tip of the combined recording and reading head so that unless the input voltage rises above substantially a third of the maximum voltage received from the pick-up coil when an X signal passes under the pole tips of the coil, no change in output is obtained from the amplifier.

As shown by curve 53 of Fig. 2 the input to the amplifier comprises a substantially large cycle of alternating current which is of a relatively short duration. Thus, so far as the desired signal is concerned, it is not necessary that the amplifier work at extremely low frequencies or direct current. Consequently, it is possible to increase the gain of the amplifier for the frequency range of recorded signals. With substantially no loss of transmission through the feedback path at direct current, the gain of the amplifier is substantially one which is insufficient at the frequencies of the signals received from the combined pick-up and recording coil. However, the loss in the feedback loop may be increased at the higher frequencies in the desired or necessary transmission band of the amplifiers by adding additional loss comprising condenser 361 and resistor 365. The values of these feedback elements may be so chosen that a desired gain may be obtained in the desired or necessary transmission band of the amplifier. Thus, when a positive pulse is applied to the grid of the upper section of tube 356 as, for example, by the first half of the curve 53 of Fig. 2, the voltage of the anode of the lower section of tube 358 is reduced, thus indicating an X signal is approaching and passing under the pole tips of the core 310. As described above, when an O signal is passing under the pole tips, the lower section of tube 358 is non-conducting with the result that the voltage of the anode of the lower section of the tube 358 which is the voltage of the output or A10 lead is at substantially positive 150 volts. However, when an X signal passes under the pole tips 310 the grid of the lower section of tube 358 becomes sufficiently positive to cause anode current to flow through the anode resistor 366 and to cause the output voltage to be reduced to 100 volts or less, thus indicating an X signal is passing under the pick-up coil 310.

As shown in Fig. 3 the output of the reading amplifier is connected by the conductor 326 to the diode 330 of the input to the writing or recording amplifier. Thus, if it is desired to write an X signal and an X signal is already recorded in the particular elemental area, the voltage on conductor 326 falls below the voltage permitting an X signal to be recorded with the result that another X signal is not recorded on top of the one already present.

If a recorded O signal had been passing under the pole-pieces of coil 310 at the time when it is desired to record an X signal, then as described above, substantially 150 volts positive is applied to lead 326 thus permitting an X signal to be recorded. Recording of the X signal will tend to reverse the output of the reading amplifier as described above, and thus reduce the voltage on the conductor 326, which might then interfere with the X signal being recorded by the recording amplifier. In order to prevent such interaction and to, in effect, interrupt the feedback loop around both the recording and receiving amplifiers, the output of the pick-up coils 313 and 314 is connected through resistor 351 to a second pair of rectifiers or diodes 367. By connecting this input lead to a pair of rectifiers rather than a single rectifier the direct-current bias on the input circuit is not disturbed or altered. These rectifiers are connected by means of voltage dividing resistor networks 381 and 382—365 so that substantially a volt positive or negative is connected to the respective rectifiers. These voltages are connected in such a direction that the rectifiers 367 normally have a high impedance so they do not transmit or appreciably affect the small pick-up voltages induced in the pick-up windings 313 and 314. They do not therefore interfere with the pick-up or reading operation of the amplifier described above.

However, when the voltage from the pick-up coils 313 and 314 exceeds a volt, as it does when a signal is recorded in the manner described above, a positive voltage is transmitted through the corresponding rectifier and condenser 361 to the grid of the lower section of the tube 356. Inasmuch as the grid of the upper section of this tube is now maintained at not more than approximately a half volt positive, the grid of the lower section becomes more positive than the grid of the upper section of tube 356 with the result that in the upper section it is substantially cut off because the cathode of both sections follows the grid of the most positive section so the cathode of the upper section becomes more positive than the grid of the upper section, thus cutting the tube off and, in effect, maintaining the output of the amplifier in the same direction as if an O signal were passing under the pole-pieces of the recording coil. The time the input voltage is between half a volt and a volt is so short at this time that it does not interfere with the operation of the circuits in the manner described herein.

If it is attempted to record an O signal instead of an X signal, then the negative voltage from this signal will again maintain the upper section of tube 356 cut off so that the output continues as if an O signal were recorded in the pole-pieces of core 310. In order to prevent the output of the amplifier from changing under these circumstances had an X signal been previously recorded in this elemental area, a small condenser 368 is connected across the anode resistor 366 of the lower section of tube 358. When the amplifier responding to the X signal recorded in the cell before the middle of the cell is under the pole-pieces as described hereinafter, the voltage of the anode of the lower section of tube 358 and thus the output of the amplifier falls to a low voltage, thus causing condenser 368 to be charged to this voltage. Then when an O signal is recorded current through the lower section of tube 358 is cut off so condenser 368 starts to discharge but maintains the output sufficiently low for a short interval of time until the cell now having an O signal recorded in it has passed under the pole tips of core 310, so that the output of the reading amplifier is maintained in accordance with the signal originally stored in any cell for substantially the entire duration of the time a cell passes under the pole tips of the core 310 independently of whether or not the opposite type of signal is written over the signal originally stored in the magnetic material.

As described with reference to Fig. 1, it is frequently desirable to have an output voltage from the pick-up or reading amplifier which is normally maintained at a low voltage and becomes high in response to an X signal passing under the pole tips of the pick-up coil. In accordance with this invention the phase inverting amplifier having a feedback resistor 410 of such value that the amplifier has substantially unity gain is employed to change the output in this manner. Such an amplifier is shown in Fig. 4 and serves to invert the phase of the output from the pick-up amplifiers. A single-stage direct-coupled amplifier tube 412 is provided which operates in the usual manner and causes low voltage to be maintained on its output lead when its input lead is connected to the output of the reading amplifier and the output of the reading amplifier is maintained at a high positive value in response to O signals passing under the pole tips of the pick-up and recording coil. Then in response to an X signal passing under the pole tips of the corresponding pick-up coil, the voltage on the output from the amplifier of Fig. 4 becomes more positive.

Fig. 4A shows the symbol representing the amplifier shown in Fig. 4 employed in Fig. 1.

What is claimed is:

1. In a calling system, a magnetic recorder for recording calling signals comprising a continuously moving surface of magnetic material, a combined magnetic recording and pick-up device located adjacent said surface, electrical connections to said device responsive to the voltage developed therein in response to the magnetic condition of an elemental area of said surface passing under said device and means controlled by said voltage for changing, during the same pass, the magnetic condition of said elemental area as said elemental area passes under said device.

2. A signal storing device comprising continuously moving surface magnetic material, a combined recording and pick-up device located adjacent said surface, means for applying either one or the other of two different electrical conditions to said device for recording either one or the other of two different magnetic conditions in an elemental area of said surface passing under said device, apparatus including said device responsive to the magnetic condition of said elemental area as it approaches said device for preventing the recording of the same magnetic condition in said elemental area as is already recorded therein.

3. A signal storing device comprising continuously moving surface magnetic material, a combined recording and pick-up device located adjacent said surface, means for applying either one or the other of two different electrical conditions to said device for recording either one or the other of two different magnetic conditions in a spot on said surface passing under said device, apparatus responsive to magnetic conditions of said spot as it approaches said device for controlling the recording of the other of said magnetic conditions in said spot during the same pass of said spot adjacent said device.

4. In a magnetic storage device, a continuously moving drum of magnetic material having permanent magnetic characteristics, a combined pick-up and recording coil located adjacent the periphery of said drum, apparatus including said coil responsive to the magnetic condition of an elemental area of said drum as said area approaches said coil, control apparatus for changing the magnetic condition of said elemental area under control of said responsive device during the same pass of said area adjacent said coil and apparatus for maintaining the response of said responsive device during the time said elemental area passes under said coil independently of any changes in the magnetic condition of said elemental area as it passes under said coil.

5. In a magnetic storage device, a continuously moving drum of magnetic material having permanent magnetic characteristics, a combined pick-up and recording coil located adjacent the periphery of said drum, apparatus including said coil responsive to the magnetic condition of an elemental area of said drum as said area approaches said coil, control apparatus for changing the magnetic condition of said elemental area under control of said responsive device and apparatus operated incident to the changing of the magnetic condition of said elemental area for rendering said responsive apparatus unresponsive to said changed condition.

6. In a recording mechanism, a continuously moving surface of magnetic materials having permanent magnet properties, a recording coil located adjacent to said moving surface, apparatus for recording either one or the other of two magnetic conditions in an elemental area of said surface as said elemental area passes under said recording device, and means operative incident to the recording of one magnetic condition in said surface for preventing the recording of the other magnetic condition therein during any single pass of said elemental area under said coil.

7. In a storage device, a continuously moving surface of magnetic material having permanent magnet properties, a combined pick-up and recording coil, apparatus responsive to the magnetic condition of an elemental area of said surface as it approaches said coil, and other apparatus for changing the magnetic condition of said elemental area as said elemental area passes under said coil during the same pass of said elemental area.

8. In a storage device a continuously moving surface for storing representations of electrical pulses thereon, a recording device located adjacent said surface, a blocking oscillator, means for normally preventing current flowing through said blocking oscillator, connection between said blocking oscillator and said recording device, and signal responsive means for overcoming said first-mentioned means and causing said blocking oscillator to apply a pulse to said recording device to change the condition of said storage surface.

9. A magnetic storage device comprising a continuously moving surface of magnetic material having permanent magnet properties, a recording device located adjacent said continuously moving surface, a pair of blocking oscillators each for imparting a different magnetic condition to a small area of said continuously moving surface, bias means for normally preventing current flowing through said blocking oscillators, and signal responsive means for overcoming the bias means of one or the other of said oscillators.

10. A magnetic storage device comprising a continuously moving surface of magnetic material having permanent magnet properties, a recording device located adjacent said continuously moving surface, a pair of blocking oscillators each for imparting a different magnetic condition to a small area of said continuously moving surface, bias means for normally preventing current flowing through said blocking oscillators, signal responsive means for overcoming the bias means of either one of said oscillators, and a common impedance element connected in the control circuit of both blocking oscillators for applying a voltage to one blocking oscillator in response to current flowing in the other blocking oscillator for preventing the simultaneous flow of current through the other of said blocking oscillators.

11. A magnetic storage device in accordance with claim 10 comprising in addition a transformer for each of said blocking oscillators, each of said transformers connecting said common impedance element with one of said blocking oscillators, said transformers having windings and capacitive connections therebetween to facilitate the build-up of current through said blocking oscillators and to restrict said blocking oscillators to a single pulse responsive to said signal responsive means.

12. A magnetic storage device in accordance with claim 11 comprising in addition dissipating resistors connected to said device to expedite the decay of flux in said device.

13. A signal storage device comprising in combination a signal circuit, scanning means for periodically scanning said circuit, signal responsive apparatus controlled by said scanning means, a continuously moving storage surface, means for recording either one of two different conditions in said surface comprising a recording device located adjacent said surface, means for determining the condition of a small area of said surface as said area approaches and passes said recording device and control means connected to said recording device and responsive to said signal responsive device and said recording device for changing the condition of said small area of said surface during the time said area passes said recording device.

14. In a storage mechanism in combination a continuously moving storage surface for recording in elemental areas thereof either one or the other of two signaling conditions, a reading and recording device adjacent said surface, and control means controlled by the signaling condition recorded in an elemental area of said surface for changing the signaling condition recorded on said elemental area as said elemental area passes under and reading and recording device during the same pass of said elemental area.

15. In a storage mechanism a storage device, a single device for both applying signals to said storage device in succession for storage therein and for recovering stored signals in a predetermined interval of time after storage therein, signal responsive means, apparatus jointly controlled by a signal recovered from a previously stored signal and said signal responsive means for controlling the signal applied to said storage device in said same interval of time during which said signal is recovered.

16. In a storage mechanism a storage device, a single device for both applying a plurality of signals to said storage device in which each signal is applied during discrete and different intervals of time and for recovering stored signals in a predetermined interval of time after storage therein, control apparatus to control signals to be recorded, apparatus jointly controlled by a recovered signal and said control apparatus for controlling the signal applied to said storage device in said same interval of time as said signal is recovered.

17. A storage device comprising at least one magnetizable spot; a pick-up device relatively movable with respect to said spot and responsive to the rate of change of magnetic flux due to the movement with respect to said spot a recording means; and a circuit control means operable in response to the operation of said pick-up device to energize said recording means to change the magnetic flux of said spot during the same pass in which the rate of change of magnetic flux causes the response in said pick-up device.

18. In the art of recording and reproducing data represented as recorded by magnetized elemental areas on a magnetic medium, a magnetic medium having a plurality of elemental areas; a magnetic recording-reproducing head having winding means thereupon and a working face; means producing relative motion between said working face and said elemental areas of said magnetic medium, said winding means having a voltage induced thereacross due to the relative motion between said working face and one of said elemental areas by said relative motion producing means according to one or another condition of said elemental area; means for supplying a control current selectively according to one or another condition and means for applying a recording current to said winding means according to said first-mentioned condition and to said control current during the same pass of said working face and said elemental area.

19. In the art of recording and reproducing data represented as recorded by magnetized elemental areas on a magnetic medium, a magnetic medium having a surface; a recording-reproducing head having a body of magnetic material, winding means thereupon and a working face; means to cause relative motion between the working face of said head and said surface, said winding means having a voltage induced therein due to the relative motion between said head and said surface by said first-mentioned means according to one or another condition of an elemental area of said surface; and means for applying a record establishing current selectively to said winding means according to said one or another condition of said elemental area during the same pass of said head and said area.

20. In the art of recording and reproducing data represented as recorded by magnetized elemental areas on a magnetic medium, a magnetic medium having a plurality of elemental areas; a magnetic recording-reproducing head having winding means thereupon and a working face; means producing relative motion between said working face and said elemental areas of said magnetic medium, said winding means having a voltage induced thereacross due to the relative motion between said working face and one of said elemental areas by said relative motion producing means according to one or another condition of said elemental area; means for supplying a control current selectively according to one or another condition; means for ascertaining the condition corresponding to the voltage induced in said winding means under control of the condition of said elemental area independently of the current set up by said supplying means; and means for applying a recording current to said winding means according to said first-mentioned condtion and to said control current during the same pass of said working face and said elemental area.

21. In the art of recording and reproducing data represented as recorded by magnetized elemental areas on a magnetic medium, a magnetic medium having a plurality of elemental areas, each of said elemental areas having a central area and a fringe area surrounding said central area; a recording-reproducing head having winding means and a working face; means producing relative motion between said working face and said elemental areas, said winding means being energized in response to the relative motion between said working face and said fringe areas according to a selected one of two conditions of said elemental areas; and means responsive to a selected one of two conditions and to said selected one of two conditions of said elemental areas to apply a recording current to said winding means as said working face passes said central areas.

22. In the art of recording and reproducing data represented as recorded by magnetized elemental areas on a magnetic medium, a magnetic medium having a plurality of elemental areas, each of said elemental areas having a central area and a fringe area continuous with said central area; a recording-reproducing head having winding means and a working face; means producing relative motion between said working face and said elemental areas, said winding means being energized in response to the relative motion between said working face and said fringe areas according to a selected one of two conditions of said elemental areas, said central and fringe areas of an elemental area being similarly magnetized to one of said two conditions; and means responsive to a selected one of two conditions and to said selected one of two conditions of said elemental areas to apply a recording current to said winding means as said working face passes said central areas during the same pass as said working faces and said fringe areas.

23. In the art of recording and reproducing data represented as recorded by magnetized elemental areas on a magnetic medium, a magnetic medium having a plurality of elemental areas, a plurality of recording-reproducing heads positioned in close proximity with said elemental areas; means producing relative motion between said plurality of heads and said elemental areas causing the selective energization of said heads in response to one of two conditions of said elemental areas; and means responsive to one of two conditions and to said one of two conditions of said elemental areas for applying a recording current to said heads during the same pass of said heads and said elemental areas.

24. A magnetic storage device comprising a continuously moving surface of magnetic material having permanent magnetic properties; a combined pick-up and recording device located adjacent said continuously moving surface; a pair of blocking oscillators each for imparting a different magnetic condition to a small area of said continuously moving surface; bias means for normally preventing current flowing through said blocking oscillators; and signal responsive means including said pick-up and recording device for overcoming said bias means of one or the other of said oscillators as the small area of said continuously moving surface passes adjacent said pick-up and recording device.

25. A magnetic storage device comprising a continuously moving surface of magnetic material having a plurality of cells; a combined pick-up and recording device located adjacent said continuously moving surface; a pair of blocking oscillators each for imparting a different magnetic condition through said combined pick-up and recording device to a selected of said cells; bias means for normally preventing current through said blocking oscillators; and signal responsive means connected to said pick-up device responsive to the magnetic condition of said selected cell for overcoming said bias means of one or the other of said oscillators.

26. In a storage mechanism in combination a continuously moving storage surface for recording in elemental areas thereof either one or the other of two signaling conditions, a reading and recording device adjacent said surface, control means controlled by the signaling condition recorded in an elemental area of said surface for changing the signaling condition recorded on said elemental area as said elemental area passes under the reading and recording device during the same pass of said elemental area, and dissipating resistors connected to said device to expedite the decay of flux in said device.

27. In the art of recording and reproducing data represented as recorded by magnetized elemental areas on a magnetic medium, a magnetic medium having a plurality of elemental areas; a magnetic recording-reproducing head having reading and writing windings thereupon and a working face; means producing relative motion between said working face and said elemental areas of said magnetic medium, said reading windings having a voltage induced thereacross due to the relative motion between said working face and one of said elemental areas by said relative motion producing means according to one or another condition of said elemental area; means for supplying a control current selectively according to one or another condition; means for ascertaining the condition corresponding to the voltage induced in said reading windings under control of the condition of said elemental area independently of the current set up by said supplying means; means for applying a recording current to said writing windings according to said first-mentioned condition and to said control current during the same pass of said working face and said elemental area; and dissipating resistors connected across said writing windings to expedite the decay of flux in said head.

28. A storage device comprising a continuously moving surface of magnetic material; a combined recording and pick-up device located adjacent said surface; a recording and a reading amplifier connected to said device; said reading amplifier having a plurality of stages, direct coupling circuits connecting said stages to reduce the normalizing speed of said reading amplifier, and a negative feedback circuit connecting the last and first of said stages to eliminate drift due to variation of said stages; the last of said stages of said reading amplifier being connected to and conditioning said writing amplifier.

29. A storage device in accordance with claim 28 wherein said direct coupling circuits comprise a plurality of cold cathode gas tubes shunted by a capacitor to provide for direct coupling and proper biasing potentials for said stages.

30. A storage device in accordance with claim 28 wherein said reading amplifier comprises in addition biased diodes connecting said first stage and said combined device to block an induced voltage from said combined device due to the operation of said writing amplifier.

31. A storage device in accordance with claim 28 comprising in addition a shunting capacitor connected across said last stage to maintain the output of said reading amplifier independent of the input thereto.

32. A storage device in accordance with claim 28 wherein said writing amplifier comprises two blocking oscillators, bias means for normally preventing current flowing through said blocking oscillators, and signal responsive means for overcoming said biasing means of one or the other of said oscillators depending upon the conditioning by said last stage of said reading amplifier.

33. A storage device in accordance with claim 32 comprising in addition dissipating resistors connected to said device to expedite the decay of flux in said device.

34. A magnetic storage device in accordance with claim 33 comprising in addition a transformer for each of said blocking oscillators, each of said transformers connecting said common impedance element with one of said blocking oscillators, said transformers having windings and capacitive connections therebetween to facilitate the build-up of current through said blocking oscillators and to restrict said blocking oscillators to a single pulse responsive to said signal responsive means.

35. A magnetic storage device comprising a continuously moving surface of magnetic material for recording in elemental areas thereof; a combined reading and recording device located adjacent said surface; and a reading and a recording amplifier connected to said device; said writing amplifier having two blocking oscillators each for imparting a different magnetic condition to one of the elemental areas of said surface and a common impedance element connected to both of said oscillators for preventing the flow of current through one of said oscillators responsive to current through the other of said oscillators, said reading amplifier having an output shunting capacitive circuit connecting said reading and writing amplifiers to condition said writing amplifier responsive to the output of said reading amplifier and to maintain the output of said reading amplifier in accordance with the original magnetic condition of said elemental area for the entire duration of time said elemental area passes adjacent said combined device independent of a change in the magnetic condition of said elemental area responsive to the operation of said writing amplifier.

36. A magnetic storage device in accordance with claim 35 wherein said reading amplifier comprises in addition a plurality of stages, direct coupling circuits between said stages to reduce the normalizing speed of said reading amplifier, and a negative feedback circuit connecting the last and first of said stages to eliminate drift due to variation of said stages.

37. A magnetic storage device in accordance with claim 36 wherein said reading amplifier comprises in addition biased diodes connecting said first stage and said combined device to block an induced voltage from said combined device due to the operation of said writing amplifier.

References Cited in the file of this patent

UNITED STATES PATENTS

| | | |
|---|---|---|
| 2,540,654 | Cohen et al. | Feb. 6, 1951 |
| 2,564,403 | May | Aug. 14, 1951 |
| 2,614,169 | Cohen | Oct. 14, 1952 |

FOREIGN PATENTS

| | | |
|---|---|---|
| 70,902 | Norway | Aug. 26, 1946 |